(12) United States Patent
Arce et al.

(10) Patent No.: US 6,493,112 B1
(45) Date of Patent: Dec. 10, 2002

(54) METHOD AND APPARATUS FOR PRODUCING HALFTONE IMAGES USING GREEN-NOISE MASKS HAVING ADJUSTABLE COARSENESS

(75) Inventors: Gonzalo R. Arce, Wilmington, DE (US); Daniel L. Lau, Newark, DE (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 09/228,573

(22) Filed: Jan. 11, 1999

Related U.S. Application Data

(60) Provisional application No. 60/071,649, filed on Jan. 16, 1998.

(51) Int. Cl.[7] ................................................. H04N 1/40
(52) U.S. Cl. ..................................... 358/3.19; 358/3.13
(58) Field of Search ........................... 358/1.9; 382/237, 382/251–253, 270, 3.19, 3.13

(56) References Cited

U.S. PATENT DOCUMENTS

| | | | |
|---|---|---|---|
| 5,055,942 A | 10/1991 | Levien | 358/456 |
| 5,111,310 A | 5/1992 | Parker et al. | 358/456 |
| 5,317,418 A | 5/1994 | Lin | 358/456 |
| 5,341,228 A | 8/1994 | Parker et al. | 358/534 |
| 5,477,305 A | 12/1995 | Parker et al. | 358/456 |
| 5,649,083 A | 7/1997 | Barkans et al. | 395/131 |
| 5,726,772 A | 3/1998 | Parker et al. | 358/456 |

*Primary Examiner*—Thomas D. Lee
*Assistant Examiner*—Stephen Brinich
(74) *Attorney, Agent, or Firm*—Connolly Bove Lodge & Hutz LLP

(57) ABSTRACT

A method and apparatus for producing halftone images which utilizes the advantageous stochastic patterning of dots found in frequency-modulated, blue-noise masks, and avoids the problem of dot gain provided in amplitude-modulated masks. Here a green-noise spectrum is used to generate a dither mask and the halftone patterns for each gray-level are subjected to the stacking constraint. The filters used in building the green-noise masks comprise filters using the conventional blue-noise mask for a coarseness parameter M'(g)=1 and filters having a principle frequency $f_g$ less than the principle frequency of blue-noise $f_b$ when coarseness parameter M'(g)>1. Unlike blue-noise dither patterns, green-noise dither patterns comprise pixel clusters, making them less susceptible to image degradation from dot gain, generating dot-profiles that are visually pleasing to the human eye.

72 Claims, 14 Drawing Sheets

METHOD AND APPARATUS FOR PRODUCING HALFTONE IMAGES USING GREEN-NOISE MASKS HAVING ADJUSTABLE COARSENESS

This application claims the benefit of Provisional Application No. 60/071,649, filed Jan. 16, 1998.

BACKGROUND OF THE INVENTION

Field of the Invention

The present invention relates generally to half-toning of images, and, more particularly, to a method and apparatus for producing halftone images using green-noise masks having adjustable coarseness.

Description of the Related Art

Many color printing devices produce color output by printing dots of different colored inks. In these instances, each pixel of a color image is represented by a color vector which is typically a CMYK (cyan, magenta, yellow, black) quadruplet. Each element within the vector is referred to as a color component in the CMYK color vector. It is sometimes convenient to consider a color image, such as a CMYK image, as the overlapping of gray-scale images where there is one gray-scale image for any one, some or all color components, and the gray-scale image for any one particular color component is the amount of that color and not necessarily the amount of black within the original color image.

Most commercial devices such as, laser printers, ink-jet printers and facsimile machines, are, with respect to any particular color component, binary-level, that is, capable of printing or not printing dots of ink. Typically, such devices are incapable of reproducing gray-scale images with respect to any particular color component. In order to reproduce gray-scale images, with respect to any particular color component, having a multitude of gray-scale values, these devices must convert the gray-scale images to binary images having only two gray-scale levels, the color component or white. The conversion must be such that the overlapping resultant binary image, when viewed by the human eye, appears to have several gray-scale values, with respect to each color component, when in fact it is just a combination of that color and white dots. Methods to convert gray-scale images to binary images for printing are referred to as "halftoning." As used herein, the term "gray-scale image" refers to the gray-scale image of a color image such as a CMYK image, as well as a black and white image.

Halftoning renders the illusion of various shades of gray by using only two levels, black and white, and can be implemented either digitally or optically. In the case of digital halftoning, points correspond to pixels. Many digital halftoning methods exist in practice today. Clustered-dot dithering, which is similar to the analog method used to render images in newspapers, and error diffusion are two such methods. The method known as halftoning via "blue-noise masks," however, is the preferred method used in the reproduction industry due to its simplicity and performance. As referred to herein, the term "blue-noise" is a pattern having predominantly high frequency components of white noise and which possesses certain visually pleasing properties, as described in U.S. Pat. No. 5,111,310 to Parker et al. Other halftoning methods of similar complexity to blue-noise masks produce significantly inferior halftone images.

The concept of blue-noise and its associated spectral characteristics have had a profound impact in digital printing technology. R. Ulichney, in "Dithering With Blue-noise," *Proceeding Of The IEEE*, January 1988, first observed that the spectral characteristics of homogeneous binary patterns created by error diffusing constant gray signals, closely follow the spectral characteristics of blue-noise and its high-frequency components. Ulichney studied the one-dimensional radially averaged power spectrum density (RAPSD) of a blue-noise binary pattern of a given gray-level g. The cut-off frequency $f_b$, also known as the principle frequency, determines the average distance between the minority pixels of a binary blue-noise pattern. Principle frequency $f_b$ depends on the gray-level and is expressed as:

$$f_b = \begin{cases} \dfrac{\sqrt{g}}{R}, & \text{for } 0 < g \le 0.5 \\ \dfrac{\sqrt{1-g}}{R}, & \text{for } 0.5 < g \le 1.0 \end{cases} \quad (1)$$

where R is the minimum distance between addressable points in the display. An additional measure utilized for analyzing binary dither patterns consists of the pair correlation defined by D. Stoyan, W. S. Kendall, and J. Mecke in *Stochiastic Geometry and Its Applications*, (John Wiley and Sons, New York, 1987) [hereinafter referred to as "Stoyan et al."]. As defined by Stoyan et al., a point process $\Phi$ is a stochastic model governing the location of points $x_i$ within the space $R^2$, where $R^2$ is the two-dimensional real space. A sample $\phi$ of the point process $\Phi$ is written as $\phi=\{x_i \epsilon R^2: i=1, \ldots, N\}$, and a scalar quantity $\phi(B)$ is defined as the number of points $x_i$ in the subset B of $R^2$. It is assumed that the point process $\phi$ is simple, meaning that $i \ne j$ implies $x_i \ne x_j$, which further implies:

$$\lim_{dV_x \to 0} \phi(dV_x) = \begin{cases} 1 & \text{for } x \in \phi \\ 0 & \text{else} \end{cases} \quad (2)$$

where $dV_x$ is the infinitesimally small area around x. In terms of a discrete dither pattern, sample $\phi$ represents the set of minority pixels such that $\phi[n]=1$ indicates a minority pixel at location n. A minority pixel is a pixel which is "on" while more than half of all pixels are "off," and which is "off" when more than half of all pixels are "on." A pixel is deemed to be turned "on" when the pixel has a smaller value than a predetermined gray level g value. A pixel is deemed to be turned "off" when the pixel has a larger value than the predetermined gray level g value. If exactly half of all pixels are "on," then either group may be treated as the minority pixels.

Given $\phi \in \Phi$, a pair correlation R(r) is defined as:

$$R(r) = \frac{E(\phi(R_y(r)) \mid y \in \phi)}{E(\phi(R_y(r)))} \quad (3)$$

where $R_y(r)$ specifies the ring centered around the point $y \in \Phi$ with an inner radius r and an outer radius r+dr, as shown in FIG. 1. In terms of a binary dither pattern, R(r) is the ratio of the average number of minority pixels located a distance d away from the minority pixel at sample y, such that $r \le d < r+dr$, to the average number of minority pixels in a region of size $N_r$ pixels with a gray-level g. Region size $N_r$ is the total number or pixels located a distance d away from the minority pixel located at sample y, such that $r \le d < r+dr$, and g is the average gray-level of the dither pattern.

As described in U.S. Pat. No. 5,111,310 issued to Parker et al., blue-noise mask halftoning, also referred to as frequency modulated (FM) screening, performs a pixel-by-pixel comparison of the gray-scale image against a halftone screen or mask having high, radially-isotropic frequency, i.e., blue-noise, characteristics. Under ideal printing conditions, blue-noise mask halftoning provides optimal rendering of gray-scale images when viewed by the human eye. However, in real printers using blue-noise mask halftoning, printed black dots are not perfect squares and neighboring pixels overlap each other causing printed images to appear darker than desired. In addition, printer distortions such as dot gain further degrade image quality. These image defects are called "artifacts" because they represent an artificial feature caused by the method of image creation instead of a true feature of the desired image.

A modified approach to the construction of a blue mask is reported in M. Yao and K. J. Parker, "Modified approach to the Construction of a blue-noise mask," *Journal of Electronic Imaging*, Vol. 3, January 1994. A hybrid deterministic/random approach is used in Y. Meng and K. J. Parker, "Dot gain compensation in the blue-noise mask," No. VI in *Human Vision, Visual Processing, and Digital Display VI*, (SPIE), 1995, for modification of blue-noise masks in order to compensate for the dot-gain problem present in printing hardware. Finally, a radially asymmetric FM mask (blue-noise mask) is derived using a novel optimization algorithm as noted in J. Allebach and Q. Lin, "FM screen design using dbs algorithm," No. VI in International Conference on Image Processing, *IEEE*, 1996. However, such modified approaches to blue-noise mask construction still fail to overcome the difficulties encountered with conventional blue-noise masks.

Traditional halftoning used in printing newspaper images and some digital halftoning algorithms, in contrast to the FM halftoning, rely upon amplitude-modulated (AM) halftoning where the size of the halftone dot varies with the gray-scale of the continuous tone image. AM halftoning is more desirable than FM halftoning when the printer characteristics depart from the ideal square pixel model. However, AM halftoning is limited to small-screen, order-dithered type algorithms, leading to less effective halftoning patterns.

SUMMARY OF THE INVENTION

An object of the invention is to provide a method for producing halftone images of better quality than those obtained using blue-noise mask (FM) halftoning, while enjoying the same implementation complexity as that of blue-noise mask halftoning.

A further object of the present invention is to provide a method for producing halftone images that overcomes the limitations of blue-noise mask (FM) halftoning, such as the occurrence of unwanted artifacts.

A still further object of the present invention is to provide a method for producing halftone images which combines the maximum dispersion attributes of blue-noise mask halftoning and the clustering qualities of AM halftoning.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a method for producing a halftone image from a gray-scale image in a computing means, the method comprising the steps of: acquiring the gray-scale image to create a gray-scale image array on a pixel-by-pixel basis; storing the gray-scale image array in a first memory of the computing means; utilizing a pixel-by-pixel comparison of the gray-scale image against a green-noise mask array stored in a second memory of the computing means; comparing, on a pixel-by-pixel basis, the value of each corresponding pixel in the gray-scale image array to produce a binary image array; and converting the binary image array to the halftone image.

Further in accordance with the objects, the present invention comprises an apparatus for producing a halftone image from a gray-scale image, the apparatus, comprising: a data acquisition means for acquiring the gray-scale image to create a gray-scale image array on a pixel-by-pixel basis; storage means for storing the gray-scale image array in a first memory of a computing means; a green-noise mask stored in a second memory of the computing means, the green-noise mask producing a pixel-by-pixel comparison of the gray-scale image; comparing means for comparing, on a pixel-by-pixel basis, the value of each corresponding pixel in the gray-scale image array to produce a binary image array; and converting means for converting the binary image array to the halftone image.

Still further in accordance with the objects, the present invention comprises an apparatus for producing a color halftone image from a series of gray-scale images, wherein each gray-scale image corresponds to each color component of the color halftone image, the apparatus comprising: a data acquisition means for acquiring any one of the gray-scale images to create a gray-scale image array on a pixel-by-pixel basis; storage means for storing the gray-scale image array in a first memory of a computing means; a green-noise mask stored in a second memory of the computing means, the green-noise mask producing a pixel-by-pixel comparison of the gray-scale image; comparing means for comparing, on a pixel-by-pixel basis, the value of each corresponding pixel in the gray-scale image array to produce a binary image array; and converting means for converting the binary image array to the halftone image.

Also in accordance with the objects, the present invention comprises a method for producing a green-noise mask for use in a method for producing a halftone image from a gray-scale image comprised of pixels, the green-noise mask production method comprising the step of: generating a sequence of binary dot profiles under a stacking constraint, wherein pixels are turned "on" in the dot profile of a gray level g and remain "on" for all dot profiles corresponding to higher values of the gray level g, and the dot profile corresponding to the gray level g has a radially averaged power spectrum with little or no low frequency components, a high frequency component that diminishes with an increasing coarseness parameter M'(g), and a sharp spectral peak at radial frequency $f_g$ where:

$$f_g = \begin{cases} \dfrac{\sqrt{\dfrac{g}{M'(g)}}}{R}, & \text{for } 0 < g \leq 0.5 \\ \dfrac{\sqrt{\dfrac{(1-g)}{M'(g)}}}{R}, & \text{for } 0.5 < g \leq 1.0, \end{cases}$$

wherein R is the minimum distance between addressable points, M'(g) is the coarseness parameter for gray level g, and the dot profile corresponding to the gray level g has a pair correlation with a non-zero value at radial distance r near zero and peaks at integer multiples of the radial distance $\lambda_g$ where:

$$\lambda_g = \begin{cases} \dfrac{R}{\sqrt{\dfrac{g}{M'(g)}}}, & \text{for } 0 < g \le 0.5 \\ \dfrac{R}{\sqrt{\dfrac{(1-g)}{M'(g)}}}, & \text{for } 0.5 < g \le 1.0. \end{cases}$$

Still further in accordance with the objects, the present invention comprises a method for producing a green-noise mask for use in a method for producing a halftone image from a gray-scale image, the green-noise mask production method comprising the step of, based upon a sequence of binary dot profiles which satisfy a stacking constraint, assigning to each element of the green-noise mask a value defined by a gray level at which a corresponding pixel in the sequence of binary dot profiles is turned "on."

Further in accordance with the objects, the present invention comprises a green-noise mask for use in a method for producing a halftone image from a gray-scale image, the green-noise mask comprising: an array of deterministic numerical values such that when the array is thresholded with a pixel-by-pixel comparison of the array with a gray level g such that each pixel of the resulting dot profile which corresponds to a pixel in the array which is less than g is turned "on" and otherwise is turned "off," wherein the resulting dot profile has a radially averaged power spectrum with little or no low frequency components, a high frequency component that diminishes with an increasing coarseness parameter M'(g), and a sharp spectral peak at approximately the radial frequency $f_g$ where:

$$f_g = \begin{cases} \dfrac{\sqrt{\dfrac{g}{M'(g)}}}{R}, & \text{for } 0 < g \le 0.5 \\ \dfrac{\sqrt{\dfrac{(1-g)}{M'(g)}}}{R}, & \text{for } 0.5 < g \le 1.0, \end{cases}$$

wherein R is the minimum distance between addressable points, M'(g) is the coarseness parameter for gray level g, and the dot profile corresponding to the gray level g has a pair correlation with a non-zero value at radial distance r near zero and peaks at integer multiples of the radial distance $\lambda_g$ where:

$$\lambda_g = \begin{cases} \dfrac{R}{\sqrt{\dfrac{g}{M'(g)}}}, & \text{for } 0 < g \le 0.5 \\ \dfrac{R}{\sqrt{\dfrac{(1-g)}{M'(g)}}}, & \text{for } 0.5 < g \le 1.0. \end{cases}$$

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DESCRIPTION OF THE PREFERRED EMBODIMENTS

Figure 1:
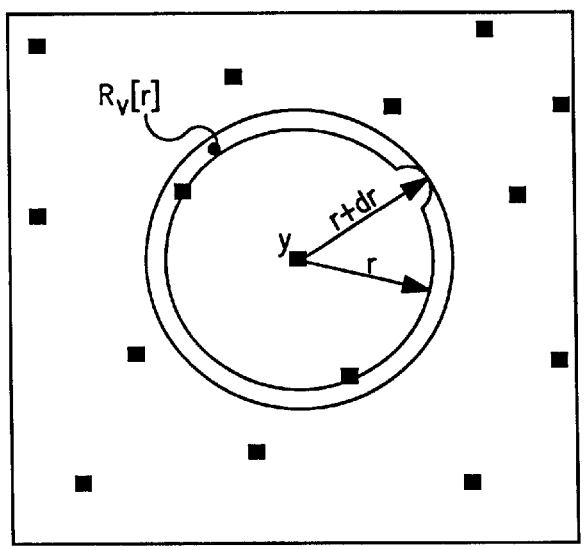
FIG. 1 is a graph showing a ring $R_y(r)$ centered around a minority pixel at sample y.

Reference will now be made in detail to the present preferred embodiments of the invention, examples of which are illustrated in the accompanying drawings. Wherever possible, the same reference numbers will be used throughout the drawings to refer to the same or like parts.

Prior to describing the drawings, the following description of the theoretical underpinnings of the present invention is provided.

In accordance with the invention, the present invention includes a method for producing binary images by using a pixel-by-pixel comparison of a gray-scale image against a screen or mask. In contrast to the blue-noise, high-frequency, masks of U.S. Pat. No. 5,111,310, the mask of the present invention comprises a green-noise mask. As referred to herein, the term "green-noise" is a pattern with predominantly mid-frequency components of white noise and which possesses certain visually pleasing properties. Visually pleasing properties is used herein as it is defined in U.S. Pat. No. 5,111,310. The green-noise masks of the present invention use non-radially symmetric dot-clustering. Thus, as opposed to conventional blue-noise masks, the green-noise masks of the present invention are not necessarily radially isotropic in frequency.

The present invention further relates to a hybrid AM-FM halftone mask which utilizes the advantageous stochastic patterning of dots found in FM (blue-noise) masks, while avoiding the halftone dot constraints and the problem of dot gain, as provided with AM masks. Here a green-noise spectrum is used to generate a dither mask and the halftone patterns for each gray-level are subjected to a stacking constraint. The filters used in the building of the green-noise mask of the present invention comprise a conventional blue-noise mask for coarseness parameter $M'(g)=1$ and filters having a principle frequency $f_g < f_b$ for $M'(g) > 1$. Unlike the blue-noise dither patterns of conventional devices, the green-noise dither patterns of the present invention have controllable coarseness, making them less susceptible to image degradation from printer distortions such as dot gain.

The method of using a cumulative distribution function to create a modified blue-noise mask in order to match specific printer characteristics, as disclosed in U.S. Pat. No. 5,477,305 issued to Parker et al., may also be applied to the green-noise mask of the present invention. However, the dot profile associated with gray level g in the modified green-noise mask has green-noise properties defined by gray level g', where $g'=CDF(G)$ and not g itself.

As a function of g, $M'(g)$ can be designed to vary g such that $M'(g)$ is high when printer distortions such as dot overlap are most noticeable (typically in the mid-gray levels near $g=0.5$) and equal to 1 when printer distortions are low (for example, when the printer produces close to the ideal square pixel).

In the present invention, there is preferably a linear relationship between the gray level g and the number of pixels that are turned "on" in the resulting dot profiles. In such a case, depending upon which pixel is larger, i.e., either a gray-scale image or the green-noise mask, a "1" (turned "on") or a "0" (turned "off") is placed in a binary (black or white) image file stored in a computer which is the halftone rendered version of the gray scale image. Without a loss of generality, using the notation that the gray scale image is U×V pixels in size and B-bits of gray per pixel, the green-noise mask can be a smaller array M×N in size where M is less than or equal to U and N is less than or equal to V with B-bits per pixel.

The green-noise mask described herein is constructed to have unique first and second order properties. When thresholded at any gray level (when compared to a gray-scale image of size M×N pixels all of a constant gray level), for example, at A% of the maximum level, nearly A out of one-hundred pixels in the green-noise mask will have values less than the threshold value. Nearly A out of one-hundred is specified because g×100% may not be an integer value, and therefore, the number will need to be rounded to the nearest integer value in order to specify a particular number of pixels in the green-noise mask. In addition, the spatial distribution of the pixels above the threshold is arranged in such a manner as to form a green-noise pattern with coarseness parameter M' defined according to the threshold value.

The green-noise mask of the present invention, therefore, has the characteristics that the first order statistics are uniformly distributed over the gray levels. That is, when the green-noise mask is thresholded at a gray level g, nearly g×100% of all pixels in the green-noise mask will have values that are less than the threshold. For $g=0.5$, nearly 50% of all pixels in the green-noise mask are below the threshold, while the remaining pixels have values above the threshold. The green-noise mask of present invention also has the characteristic that when it is thresholded at any gray level g, the resulting binary array has a power spectrum consistent with and approximating the green-noise pattern for that threshold with coarseness parameter M'. Additionally, since the green-noise mask is constructed with explicit "wrap-around" properties, a small green-noise pattern of M×N pixels can be used to halftone render a larger image of size U×V pixels because the pixel-by-pixel comparison can proceed modulo M and modulo N in the respective directions, with no apparent discontinuities or obvious periodicities.

The binary pattern that results after thresholding the green-noise mask at a constant gray level g is called the dot profile for that level. The dot profiles are arrays that have the same dimensions as the mask array and consist of ones and zeros. The ratio of ones and zeros is different for every dot profile and depends upon the gray level that the particular dot profile represents. In the notation used herein, the higher the gray level, more ones and less zeros will be contained in the dot profile. x[m, n, g] denotes the value of the dot profile at pixel location (m, n) and for gray level g. Gray level $g=0$ represents an "off" condition (that is, a printed black dot on white paper), while gray level $g=1$ represents an "on" condition (that is, no printed black dot on white paper). Therefore, gray level g may be anywhere within the range $0<g<1$.

Alternatively, there may be a non-linear relationship between g and the number of pixels that are turned "on" through use of a cumulative distribution function CDF(g). In such a case, the modified green-noise mask described herein is constructed to have unique first and second order properties. When thresholded at any gray level (when compared to a gray scale image of size M×N pixels, all of a constant gray level), for example, at A% of the maximum level, nearly A'(where A' is related to A according to cumulative distribution function CDF(A)) out of one-hundred pixels in the green-noise mask will have values less than the threshold value. In addition, the spatial distribution of the minority pixels in the resulting dot profile are arranged to form a green-noise pattern with coarseness parameter M' defined according to the threshold value.

The modified green-noise mask of the present invention, therefore, has the characteristics that the first order statistics are defined according to the CDF over the gray levels. That is, when the green-noise mask is thresholded at a gray level g, as close to CDF(g)×100% of all pixels as possible in the green-noise mask will have values that are less than the threshold value. For g=0.5, nearly CDF(0.5)×100% of all pixels in the green-noise mask are below the threshold, while the remaining pixels have values above the threshold. The modified green-noise mask also has the characteristic that when thresholded at any gray level g, the resulting binary array has a power spectrum consistent with and approximating the green-noise pattern for the threshold CDF(g) and with coarseness parameter M'(g). Additionally, since the modified green-noise mask is constructed with explicit "wraparound" properties, a small green-noise pattern of M×N pixels can be used to halftone render a larger image of size U×V pixels because the pixel-by-pixel comparison can proceed modulo M and modulo N in the respective directions, with no apparent discontinuities or obvious periodicities.

Either green-noise mask of the present invention may be applied to any one of a series of gray-scale images, wherein there is one gray-scale image for each color component of a color image. In color halftoning, each color component of the color image may have its own green-noise mask. For example, the parameters used to construct a green-noise mask for a cyan gray-scale image component could be completely different that the parameters use for a magenta, yellow, and/or black gray-scale image components. The green-noise mask of the present invention is used to convert a gray-scale image to a binary image, whether that be in converting a gray-scale image for a black-and-white printer, converting a gray-scale image of a single ink in a CMYK printer, or converting all of the gray-scale images of a color image for a CMYK printer.

Thus, the present invention is directed to an apparatus and method for producing a halftone image from a gray-scale image in a computing means, the method comprising the steps of: acquiring the gray-scale image to create a gray-scale image array on a pixel-by-pixel basis; storing the gray-scale image array in a first memory of the computing means; utilizing a pixel-by-pixel comparison of the gray-scale image against a green-noise mask array stored in a second memory of the computing means; comparing, on a pixel-by-pixel basis, the value of each corresponding pixel in the gray-scale image array to produce a binary image array; and converting the binary image array to the halftone image.

Figure 2:
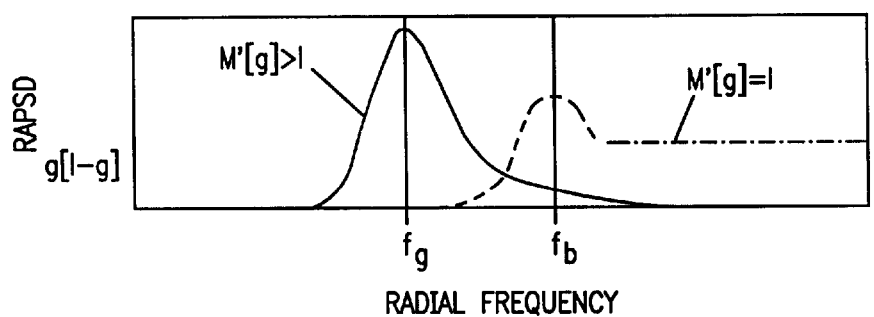
FIG. 2 is a graph showing the radially averaged power spectrum density (RAPSD) of a green-noise dot profile.
Figure 3:
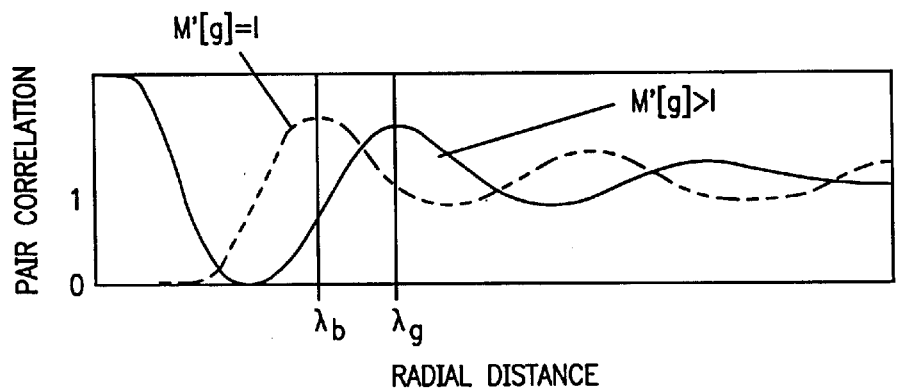
FIG. 3 is a graph showing the pair correlation of a green-noise dot profile.

The present invention is further drawn to a method for producing a green-noise mask for use in a method for producing a halftone image from a gray-scale image comprised of pixels, the green-noise mask production method comprising the step of generating a sequence of binary dot profiles under a stacking constraint, wherein pixels are turned "on" in a dot profile of a gray level g and remain "on" for all dot profiles corresponding to higher values of the gray level g, and the dot profile corresponding to the gray level g has a radially averaged power spectrum (as defined by Ulichney and as shown in FIG. 2) with little or no low frequency components, a high frequency component that diminishes with an increasing coarseness parameter M'(g), and a sharp spectral peak at approximately radial frequency $f_g$ where:

$$f_g = \begin{cases} \dfrac{\sqrt{\dfrac{g}{M'(g)}}}{R}, & \text{for } 0 < g \le 0.5 \\[2ex] \dfrac{\sqrt{\dfrac{(1-g)}{M'(g)}}}{R}, & \text{for } 0.5 < g \le 1.0, \end{cases} \quad (4)$$

wherein R is the minimum distance between addressable points, M'(g) is the coarseness parameter for gray level g, and the dot profile corresponding to the gray level g has a pair correlation (as defined by Stoyan et al. and as shown in FIG. 3) with a non-zero value at radial distance r near zero and peaks at integer multiples of radial distance $\lambda_g$ where:

$$\lambda_g = \begin{cases} \dfrac{R}{\sqrt{\dfrac{g}{M'(g)}}}, & \text{for } 0 < g \le 0.5 \\[2ex] \dfrac{R}{\sqrt{\dfrac{(1-g)}{M'(g)}}}, & \text{for } 0.5 < g \le 1.0. \end{cases} \quad (5)$$

As shown in FIG. 2, the radially averaged power spectrum density (RAPSD) of green-noise has three distinct features: little or zero low frequency components, a sharp spectral peak at approximately the radial frequency $f_g$ and a high frequency component which diminishes with an increasing coarseness parameter M'(g). Furthermore, green-noise preferably is radially symmetric, but need not be. Similarly, as shown in FIG. 3, the pair correlation of green-noise has two unique features, a sharp peak near radial distance $\lambda_g$ and a non-zero value at a radial distance near zero, wherein the radial distance is equal to the minimum distance R between addressable points. "Near zero" is disclosed since the pair correlation as defined by Stoyan et al. Is always zero at radial distance zero.

The present invention is also drawn to a method for producing a green-noise mask for use in a method for producing a halftone image from a gray-scale image, the green-noise mask production method comprising the step of, based upon a sequence of binary dot profiles which satisfy a stacking constraint, assigning to each element of the green-noise mask a value defined by a gray level at which a corresponding pixel in the sequence of binary dot profiles is turned "on."

Finally, the present invention is drawn to a green-noise mask for use in a method for producing a halftone image from a gray-scale image, the green-noise mask comprising: an array of deterministic numerical values such that when the array is thresholded with a pixel-by-pixel comparison of the array with a gray level g such that each pixel of the resulting dot profile which corresponds to a pixel in the array which is less than g is turned "on" and otherwise is turned "off," wherein the resulting dot profile has a radially averaged power spectrum (as defined by Ulichney and as shown in FIG. 2) with little or no low frequency components, a high frequency component that diminishes with an increasing coarseness parameter M'(g), and a sharp spectral peak at radial frequency $f_g$ where:

$$f_g = \begin{cases} \dfrac{\sqrt{\dfrac{g}{M'(g)}}}{R}, & \text{for } 0 < g \le 0.5 \\[2ex] \dfrac{\sqrt{\dfrac{(1-g)}{M'(g)}}}{R}, & \text{for } 0.5 < g \le 1.0, \end{cases}$$

wherein R is the minimum distance between addressable points, M'(g) is the coarseness parameter for gray level g, and the dot profile corresponding to the gray level g has a pair correlation (as defined by Stoyan et al. and as shown in FIG. 3) with a non-zero value at radial distance r near zero and a peak at integer multiples of the radial distance $\lambda_g$ where:

$$\lambda_g = \begin{cases} \dfrac{R}{\sqrt{\dfrac{g}{M'(g)}}}, & \text{for } 0 < g \le 0.5 \\[2ex] \dfrac{R}{\sqrt{\dfrac{(1-g)}{M'(g)}}}, & \text{for } 0.5 < g \le 1.0. \end{cases}$$

With this theoretical background of the present invention, reference will now be made to the drawings. The convention is used that an image constitutes an array of U×V pixels such that the gray level g of a pixel is represented by B binary bits, a pixel value of "0" corresponds to black, and a pixel value of $2^B-1$ corresponds to white. Furthermore, gray level g represents the normalized gray level such that g=0 corresponds to black and g=1 corresponds to white. Finally, all of the algorithms described below are preferably performed in a microprocessor of computer or other similar device.

A. Green-Noise Mask Spectral Algorithm
1. Spectral Domain Procedure No. 1

Figure 4:
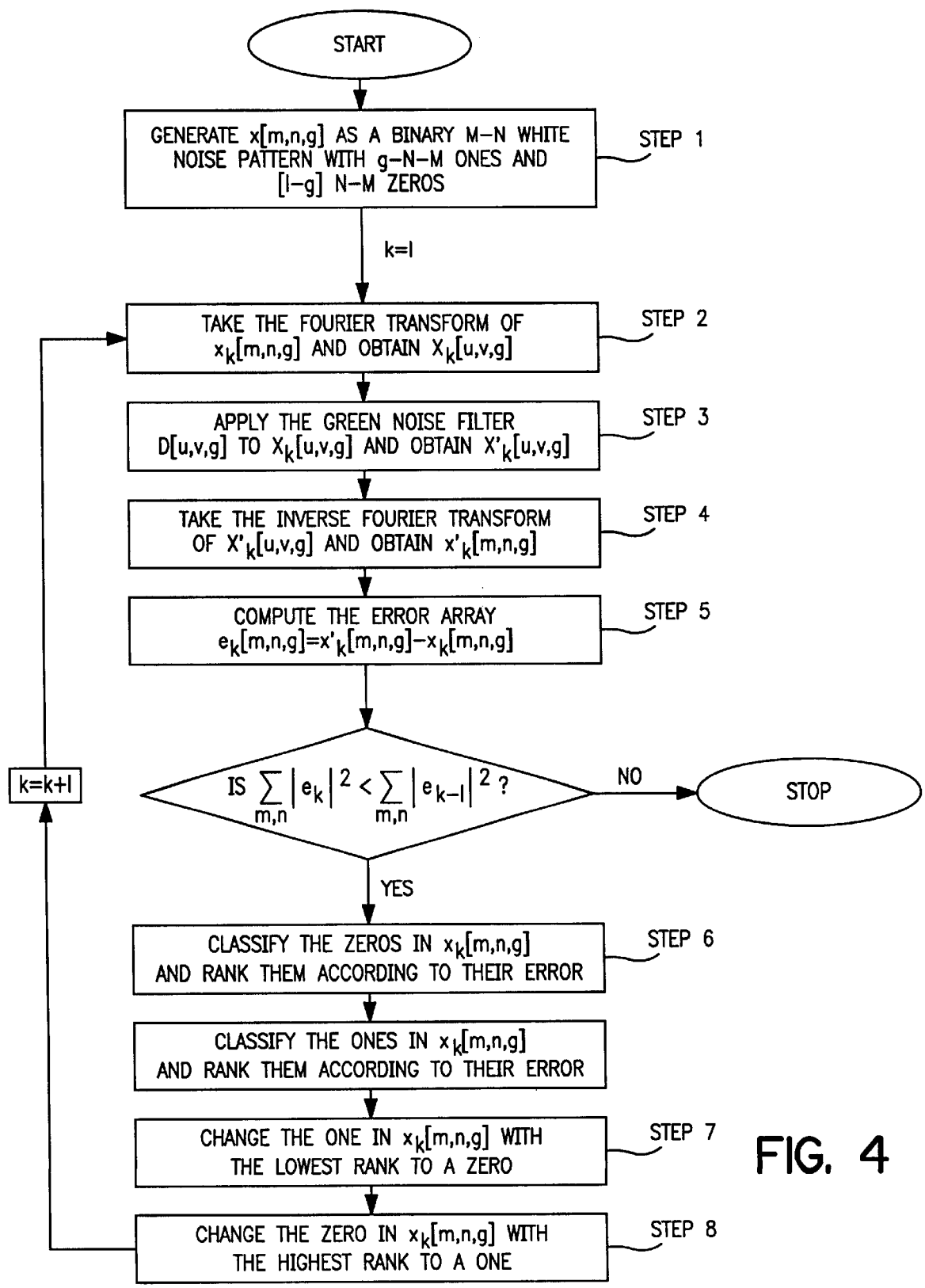
FIG. 4 is a flow chart showing the steps of Algorithm 1 for creating an initial binary dot profile having green-noise properties in accordance with a first preferred embodiment of the present invention.

The green-noise mask of the present invention is constructed by creating the binary dot profile x[m, n, $g_i$], corresponding to the arbitrary gray level $g_i$ and chosen so that 0<$g_i$<1, using the steps of Algorithm 1 shown in FIG. 4. Algorithm 1 (g=$g_i$) comprises the steps of:

Step 1: Generate the initial pattern $x_1$[m, n, g] as a binary M×N white noise array so that $x_1$[m, n, g] has as close to g·M·N pixels as possible set to one while the remaining pixels are all set to zero. Set k=1.

Step 2: Take the two-dimensional Fourier transform of the dot profile $x_k$[m, n, g] and obtain the transformed dot profile $X_k$[u, v, g], where u and v are the transformed coordinates and X represents the Fourier transform of x.

Step 3: Apply a green-noise filter D[u, v, g], which is not necessarily radially symmetric and which has a coarseness parameter M'(g), to spectrum $X_k$[u, v, g] so to obtain a new spectrum $X'_k$[u, v, g]=$X_k$[u, v, g]×D[u, v, g]. The green-noise filter is designed so that the radially averaged power spectrum of the dot profile spectrum $X'_k$[u, v, g] is approximately as shown in FIG. 2.

Step 4: Take the inverse Fourier transform of $X'_k$[u, v, g] and obtain $x'_k$[m, n, g] which is no longer binary but has increased spectral density near the green-noise principle frequency $f_g$ for gray level g and coarseness parameter M'(g).

Step 5: Form the difference $e_k$[m, n, g] $x'_k$[m, n, g]−$x_k$[m, n, g], referred to as an error array. If the total squared error, calculated as $\Sigma^M_{m=1}\Sigma^N_{n=1}|e_k[m, n, g]|^2$, is greater than the total squared error of the previous iteration, k−1, then the procedure stops with the final dot profile x[m, n, g] given by $x_{k-1}$[m, n, g], otherwise the procedure continues to Step 6.

Step 6: Classify all pixels into two classes according to the value $x_k$[m, n, g] for each pixel, with all ones belonging in a first class and all zeros belonging in a second class. Then, rank in order all the pixels in those two classes according to the value $e_k$[m, n, g] for each pixel so that the highest ranked pixel is greater than or equal in value to all other error pixels in that class and the lowest ranked pixel is less than or equal to all other pixels in that class.

Step 7: Identify the pixel in the first class with the lowest rank and set that pixel to zero.

Step 8: Identify the pixel in the second class with the highest rank and set that pixel to one. Set k=k+1 and return to Step 2.

From the dot profile x[m, n, $g_i$], define another array c[m, n], referred to as the cumulative array, and give a value of $(2^B-1)\cdot g_i$ to every pixel whose corresponding pixel in the dot profile x[m, n, $g_i$] is zero. Otherwise, assign each pixel a value of $(2^B-1)\cdot g_i-1$. In that way, when the cumulative array, which will eventually become the green-noise mask, is thresholded at a gray level $g_i$, and the resulting dot profile is equal to x[m, n, $g_i$].

After generating the dot profile for gray level $g_i$, the gray level $g_i$+dg is constructed, where dg is $\frac{1}{2}^B$, and $2^B$ is the quantization limit. The dot profile x[m, n, $g_i$+dg] for gray level $g_i$+dg is generated utilizing the interactive procedure shown in FIG. 5, where g=$g_i$ and is described as:

Step 1: Generate an initial pattern $x_1$ [m, n, g+dg] by randomly choosing as close to M·N·dg pixels of x[m, n, $g_i$] having a zero value and setting each of these chosen pixels to one. Set k=1.

Step 2: Take the two-dimensional Fourier transform of the dot profile $x_k$[m, n, g+dg] and obtain the transformed dot profile $X_k$[u, v, g+dg], where u and v are the transformed coordinates, and X represents the Fourier transform of x.

Step 3: Apply a green-noise filter D[u, v, g+dg], which is not necessarily radially symmetric and which has a coarseness parameter M'(g), to the spectrum $X_k$[u, v, g+dg], so to obtain the new spectrum $X'_k$[u, v, g+dg]=$X_k$[u, v, g+dg]×D[u, v, g+dg]. The green-noise filter is designed such that the radially averaged power spectrum of the dot profile spectrum $X'_k$[u, v, g+dg] is approximately as that shown in FIG. 2.

Step 4: Take the inverse Fourier transform of $X'_k$[u, v, g+dg] and obtain $x'_k$[m, n, g+dg], which is no longer binary but has increased spectral density near the green-noise principle frequency $f_g$ for gray level g and coarseness parameter M'(g).

Step 5: Form the difference $e_k$[m, n, g+dg]=$X'_k$[m, n, g+dg]−$x_k$[m, n, g+dg], wherein that difference is referred to as the error array. If the total squared error is greater than the total squared error of the previous iteration, k−1, then the procedure stops with the final dot profile x[m, n, g+dg] given by $x_{k-1}$[m, n, g+dg] otherwise the procedure continues to Step 6.

Step 6: Classify all pixels into two classes according to the value of $x_k$[m, n, g+dg] for each pixel with all ones in $x_k$[m, n, g+dg] in a first class and all to zeros in x[m, n, g] in a second class. Then, rank in order all the pixels in those two classes according to the value of $e_k$[m, n, g+dg] for each pixel so that the highest ranked pixel is greater than or equal in value to all other error pixels in that class and that the lowest ranked pixel is less than or equal to all other error pixels in that class.

Step 7: Identify the pixel in the first class with the lowest rank and set that pixel to zero.

Step 8: Identify the pixel in the second class with the highest rank and set that pixel to one. Set k=k+1 and return at Step 2.

Figure 5:
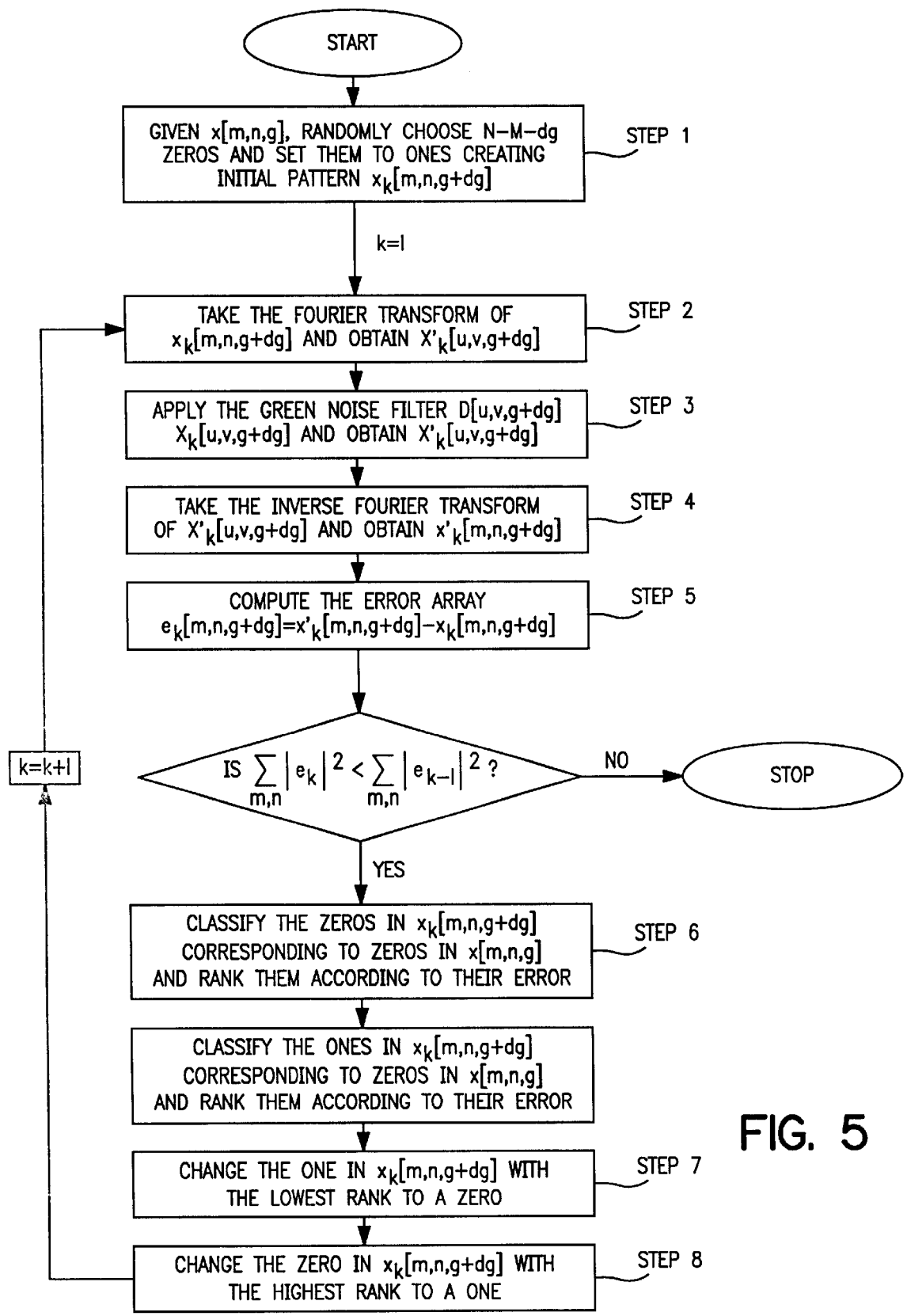
FIG. 5 is a flow chart illustrating the steps of Algorithm 2 for creating binary dot profile x[m, n, g+dg] given x[m, n, g] in accordance with the first preferred embodiment of the present invention.

Once completed, the cumulative array is updated by adding a one only to those pixels that still correspond to a zero in the dot profile x[m, n, g+dg]. The iterative procedure of FIG. 5 is then repeated until the dot profiles for all the gray levels from $g_i$–dg to 1 (where all pixels of x [m, n, g] are set to one) are created. The gray levels from $g_i$–dg to 0 (where all pixels are set to zero) are then created using the iterative procedure of FIG. 6, described as:

Step 1: Generate an initial pattern $x_1$[m, n, g–dg] by randomly choosing as close to M·N dg pixels as possible of x[m, n, $g_1$] with value of one and setting each of the chosen pixels to zero. Set k=1.

Step 2: Take a two-dimensional Fourier transform of the dot profile $x_k$[m, n, g–dg] and obtain the transformed dot profile $X_k$[m, n, g+dg], where u and v are the transformed coordinates and X represents the Fourier transform of x.

Step 3: Apply a green-noise filter D[u, v, g–dg], which is not necessarily radially symmetric and which has a coarseness parameter M'(g), to the spectrum $X_k$[ u, v, g–dg] and in the way obtained the new spectrum $X'_k$[u, v, g–dg]=$X_k$[ u, v, g–dg] x D[u, v, g–dg]. The green-noise filter is designed such that the radially averaged power spectrum of the dot profile spectrum $X'_k$[u, v, g–dg] is approximately as that shown in FIG. 2.

Step 4: Take the inverse Fourier transform of X'k [u, v, g–dg] and obtain $x'_k$[m, n, g–dg], which is no longer binary but has increased spectral density near the green-noise principle frequency $f_g$ for gray level g and coarseness parameter M'(g).

Step 5: Form the difference $e_k$[m, n, g–dg]=$x'_k$[m, n, g–dg]–$x_k$[m, n, g–dg], referred to as an error array. If the total squared error is greater than the total squared error of the previous iteration, k–1, than the procedure stops with the final dot profile x[m, n, g–dg] given by $x_{k-1}$[m, n, g–dg], otherwise the procedure continues to Step 6.

Step 6: Classify all pixels into two classes according to the value of $x_k$[m, n, g–dg] for each pixel, with all ones in $x_k$[m, n, g–dg] belong in a first class and all zeros in x) [m, n, g] belonging in a second class. Then, rank in order all the pixels in those two classes according to the value of $e_k$[m, n, g–dg] for each pixel such that the highest ranked pixel is greater than or equal in value to all other error pixels in that class and that the least ranked pixel is less than or equal to all other error pixels in that class.

Step 7: Identify the pixel in the first class with the lowest rank and set that pixel to zero.

Step 8: Identify the pixel in the second class with the highest rank and set that pixel to one. Set k=k+1 and return to Step 2.

The cumulative array is then updated by subtracting a one from those pixels that still correspond to a one in the dot profile x[m, n, g–dg]. When the process has been implemented for all gray levels g, the cumulative array contains the desired green-noise dot profile for all levels, and is therefore the desired green-noise mask. The complete procedure for constructing the green-noise mask, as described above and in FIGS. 4–6, is given in FIG. 7.

2. Spectral Domain Procedure No. 2

As a modification to the algorithm of FIG. 4, steps 2, 3 and 4 may be replaced with the following step:

Using circular convolution in two dimensions, apply a green-noise filter d[m, n, g], which is not necessarily radially symmetric and which has a coarseness parameter M'(g), to $x_k$[m, n, g] so to obtain $x'_k$[m, n, g].

Figure 6:
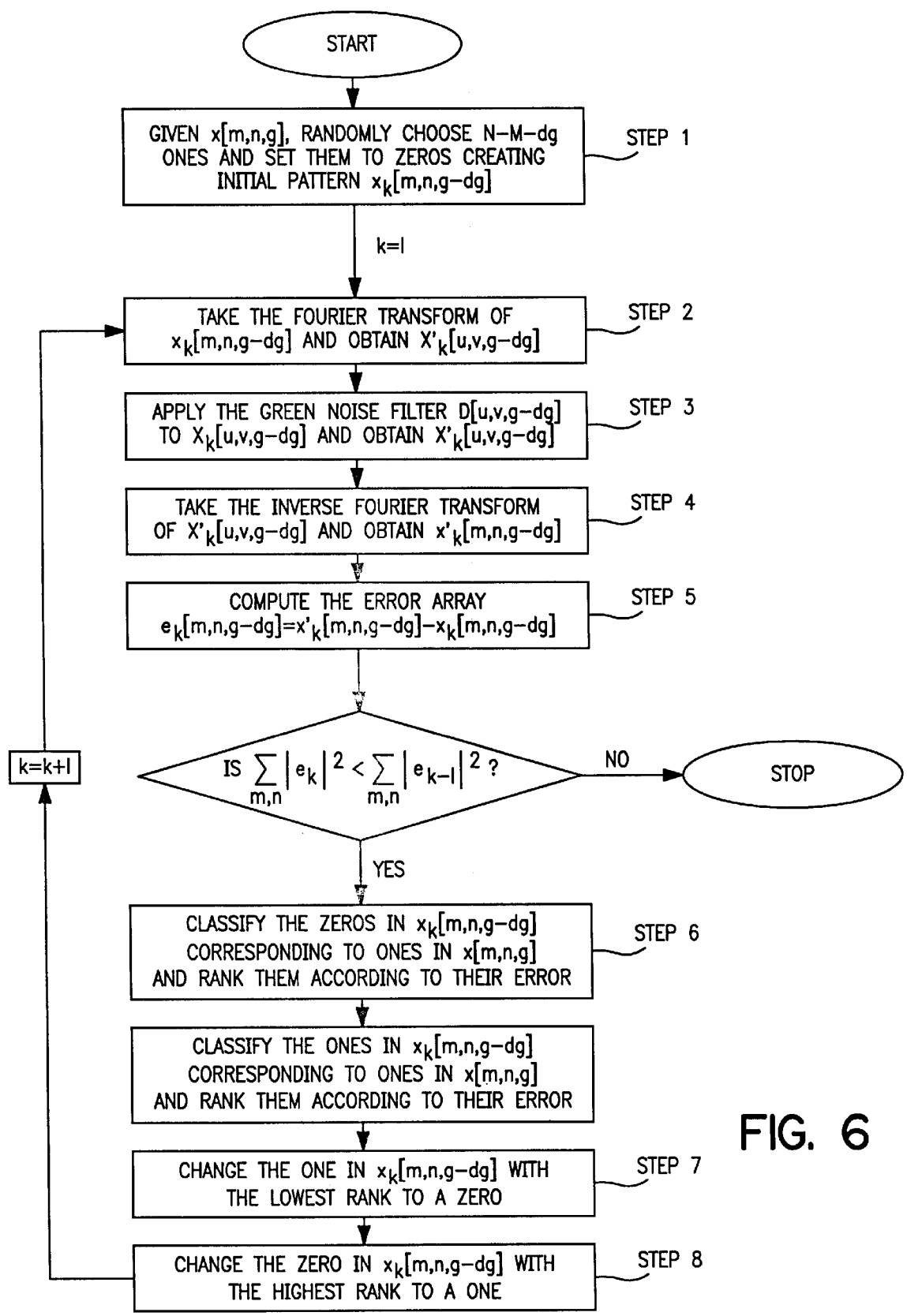
FIG. 6 is a flow chart showing the steps of Algorithm 3 for creating binary dot profile x[m,n, g−dg] given x[m, n, g] in accordance with the first preferred embodiment of the present invention.
Figure 7:
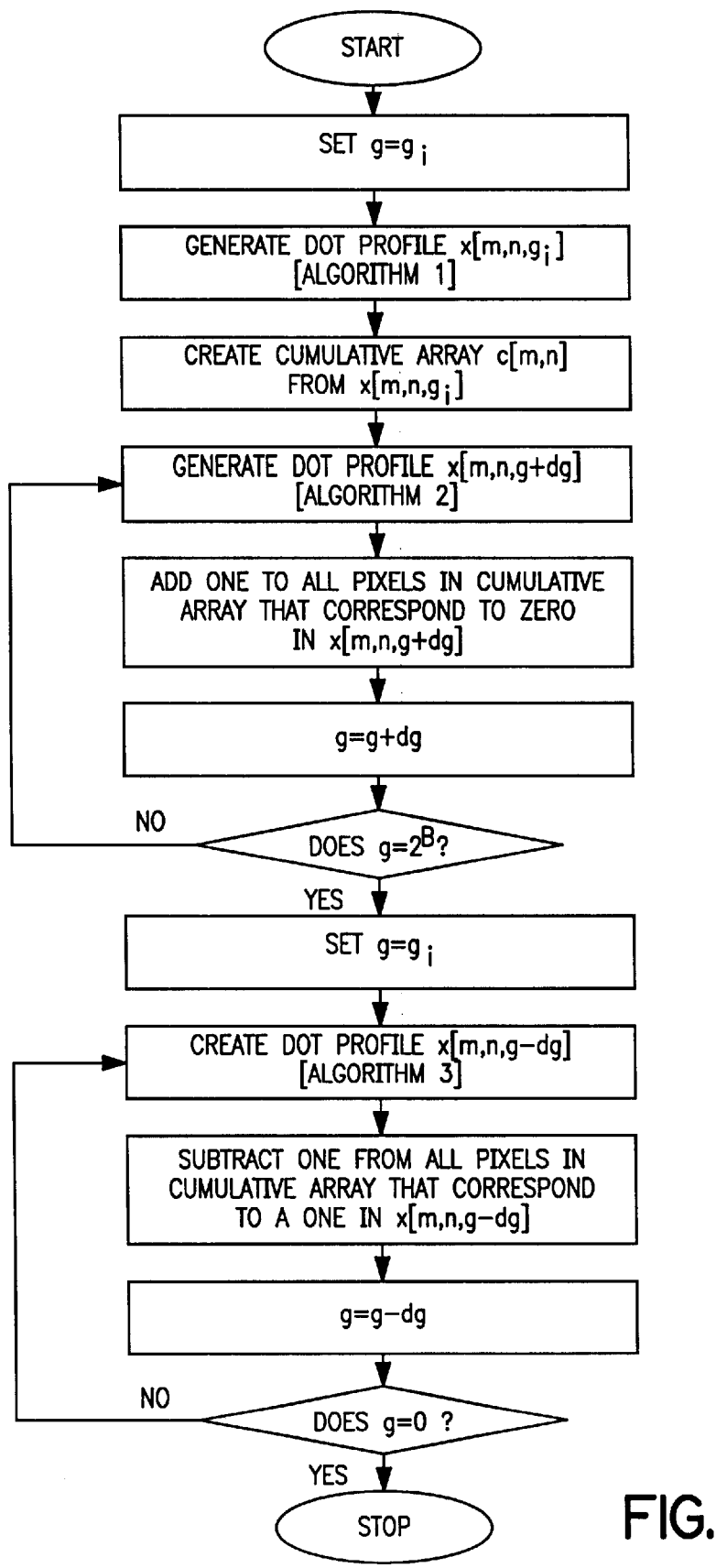
FIG. 7 is a flow chart illustrating the complete procedure (Spectral Domain Procedure 1) for constructing the green-noise mask in the spatial domain in accordance with the first preferred embodiment of the present invention.

The same modification can be made to the algorithms of FIGS. 5 and 6.

B. Green-Noise Mask Spatial Algorithm

1. Spatial Domain Procedure No. 1

The green-noise mask is constructed as follows: first, a binary dot profile x[m, n, $g_i$] that corresponds to an arbitrary gray level $g_i$, and is chosen such that 0<$g_i$<0.5, is created by utilizing the iterative procedure shown in FIG. 8 where g=$g_i$ and described as:

Step 1: Generate $x_1$[m, n, g] as a binary M×N array with all pixels set to zero. Randomly select one pixel in $x_1$[m, n, g], and set that pixel to one. Set k=1.

Step 2: The array $x_k$[m, n, g] has k pixels set to one and each of these k pixels has coordinates with $x_k$[m, n, g] in denoted as $x_i$[$m_i$, $n_i$], where i=1, 2, . . . , k. Given the green-noise pair correlation filter R(r, a, g), which is not necessarily radially symmetric and which has a coarseness parameter M'(g), is designed to create a dot profile with a pair correlation which approximates that of FIG. 3, the influence array $q_k$[m, n, g] is calculated as:

$$q_k[m, n, g] = \prod_{i=1}^{k} R\left(\sqrt{(m')^2 + (n')^2}, \arctan\frac{m'}{n'}, g\right)$$

where m'=min{|m–$m_i$|, M–|m–$m_i$|}$^2$ and n'=min{|n–$n_i$|, N–|n–$n_i$|}$^2$.

Step 3: Multiply, on a pixel-by-pixel basis, the influence array $q_k$[m, n, g] with an M×N white noise array w[m, n] to obtain the profit array $p_k$[m, n, g].

Step 4: Classify all pixels set to zero in $x_k$[m, n, g] and rank them according to their profits in $p_k$[m, n, g] such that the highest ranked pixel is greater than or equal in value to all other profit pixels in that class.

Step 5: Identify the pixel in the class with the highest rank, and set that pixel to one. Determine if a sufficient number of pixels ("sufficient" meaning that the number of pixels in $x_k$[m, n, g] that are set to one is as close to g·M·N as possible) are set to one in $x_k$[m, n, g]. If so, stop with the final dot profile x[m, n, g] given by $x_k$[m, n, g], otherwise set k=k+1 and return to Step 2.

From the dot profile x[m, n, $g_i$], define another array, c[m, n], referred to as the cumulative array, and give a value of ($2^B$–1) $g_i$–1 to every pixel whose corresponding pixel in the dot profile x[m, n, $g_i$] is one otherwise, assign a zero.

Figure 9:
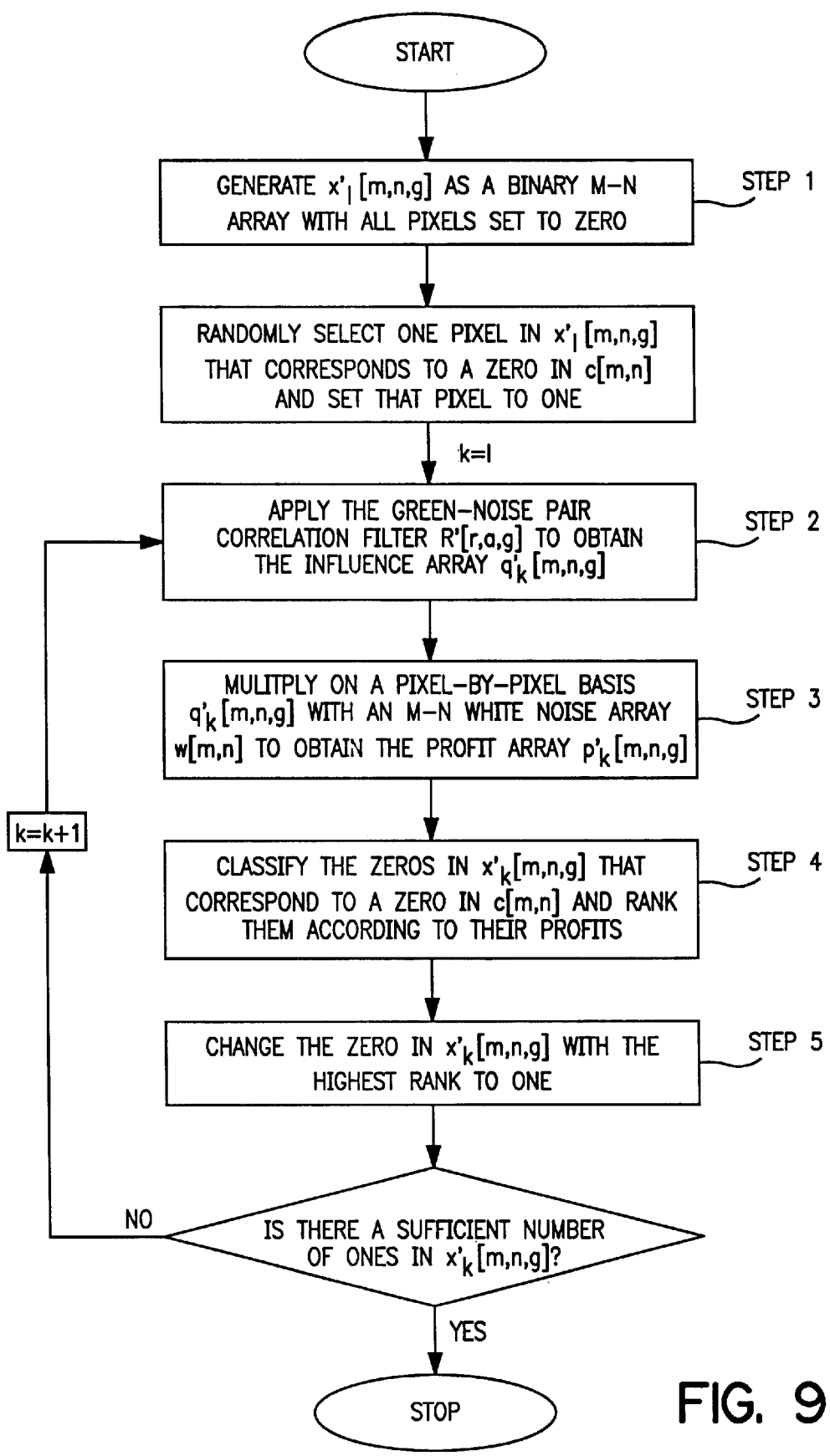
FIG. 9 is a flow chart showing the steps of Algorithm 5 for creating a complement binary dot profile x'[m, n, g] given x[m, n, g] and in accordance with the second preferred embodiment of the present invention.

The second step in creating the green-noise mask involves generating a complement dot profile for gray level 1–$g_i$. This new profile x'[m, n, $g_i$] is constructed in a similar fashion to x[m, n, $g_i$] where a one in x'[m, n, $g_i$] corresponds to a zero in the cumulative array for level 1–$g_i$. The algorithm for constructing x'[m, n, $g_i$] is illustrated in FIG. 9, where g=$_i$, and is described as:

Step 1: Generate $x'_1$[m, n, $g_i$] as a binary M×N array with all pixels set to zero. Randomly select one pixel in $x'_1[m, n, g_i]$ that corresponds to a zero in $c[m, n]$, and set that pixel to one. Set $k=1$.

Step 2: The array $x'_k[m, n, g]$ has k pixels set to one, and each of these k pixels has coordinates within $x'_k[m, n, g]$ denoted as $x'_i=[m_i, n_i]$ where $i=1, 2, \ldots, k$. Given the green-noise pair correlation filter $R'(r, a, g)$, which is not necessarily radially symmetric and which has a coarseness parameter $M'(g)$, is designed to create a dot profile with a pair correlation which approximates that of FIG. 3, the influence array $q'_k[m, n, g]$ is calculated as:

$$q'_k[m, n, g] = \prod_{i=1}^{k} R'\left(\sqrt{(m')^2 + (n')^2}, \arctan\frac{m'}{n'}, g\right)$$

where $m'=\min\{|m-m_i|, M-|m-m_i|\}^2$ and $n'=\min\{|n-n_i|, N-|n-n_i|\}^2$.

Step 3: Multiply, on a pixel-by-pixel basis, the influence array $q'_k[m, n, g]$ with an M×N white noise array $w[m, n]$ to obtain the profit array $p'_k[m, n, g]$.

Step 4: Classify all pixels set to zero in $x'_k[m, n, g]$ that correspond to a zero in $c[m, n]$ and rank them according to their profits in $p'_k[m, n, g]$ such that the highest ranked pixel is greater than or equal in value to all other profit pixels in that class.

Step 5: Identify the pixel in the class with the highest rank, and set that pixel to one. Determine if a sufficient number of pixels are set to one in $x'_k[m, n, g]$. If so, stop with the final dot profile $x'[m, n, g]$ given by $x'_k[m, n, g]$, otherwise set $k=k+1$ and return to Step 2.

Once complete, $x'[m, n, g_i]$ holds the inverse dot profile (inverse meaning a one where the dot profile will have a zero and a zero where the dot profile will have a one) after thresholding the green-noise mask with gray level $1-g_i$. This means that pixels in the cumulative array which correspond to a one in $x'[m, n, g_i]$ will have a value greater than or equal to $(2^B-1)\cdot(1-g_i)$ while pixels that correspond to a zero in $x'[m, n, g_i]$ will have a value lees than $(2^B-1)\cdot(1-g_i)$. For each pixel in the cumulative array which correspond to a one in $x'[m, n, g_i]$, assign the value $2^B$.

Figure 10:
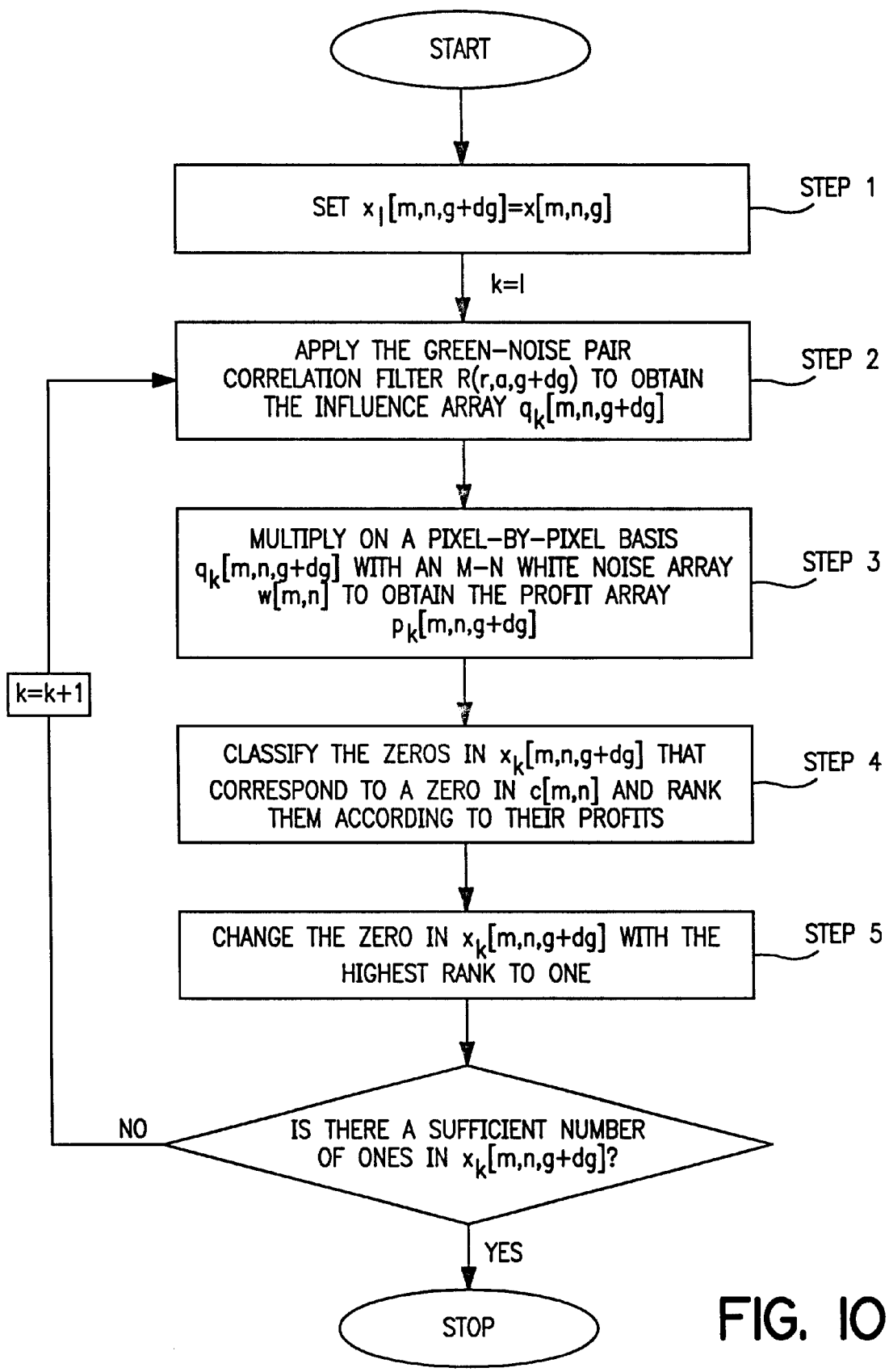
FIG. 10 is a flow chart illustrating the steps of Algorithm 6 for creating binary dot profile x[m, n, g+dg] given x[m, n, g] and in accordance with the first preferred embodiment of the present invention.

The next step in constructing the green-noise mask involves replacing pixels in $x[m, n, g_i]$ that are currently set to zero and correspond to a zero in the cumulative array with pixels set to one in order to create $x[m, n, g_i+dg]$. This is done using the algorithm illustrated in FIG. 10 where $g=g_i$, and described as:

Step 1: Set the array $x_1[m, n, g_i+dg]=x[m, n, g]$. Set $k=1$.

Step 2: The array $x_k[m, n, g_i+dg]$ has i pixels set to one, and each of these i pixels has coordinates within $x_k[m, n, g_i+dg]$ denoted as $x_i=[m_i, n_i]$ where $i=1, 2, \ldots, k$. Given the green-noise pair correlation filter $R(r, a, g+dg)$ which is not necessarily radially symmetric and which has a coarseness parameter $M'(g)$, the influence array $q_k[m, n, g+dg]$ is calculated as:

$$q_k[m, n, g+dg] = \prod_{i=1}^{l} R\left(\sqrt{(m')^2 + (n')^2}, \arctan\frac{m'}{n'}, g+dg\right)$$

where $m'=\min\{|m-m_i|, M-|m-m_i|\}^2$ and $n'=\min\{|n-n_i|, N-|n-n_i|\}^2$.

Step 3: Multiply, on a pixel-by-pixel basis, the influence array $q_k[m, n, g+dg]$ with an M×N white noise array $w[m, n]$ to obtain the profit array $p_k[m, n, g+dg]$.

Step 4: Classify all pixels set to zero in $x_k[m, n, g]$ that correspond to a zero in $c[m, n]$ and rank them according to their profits in $p_k[m, n, g+dg]$ such that the highest ranked pixel is greater than or equal in vale to all other profit pixels in that class.

Step 5: Identify the pixel in the class with the highest rank, and set that pixel to one. Determine if a sufficient number of pixels are set to one in $x_k[m, n, g+dg]$. If so, stop with the final dot profile $x[m, n, g+dg]$ given by $x_k[m, n, g+dg]$, otherwise set $k=k+1$ and return to Step 2.

The cumulative array is then updated by setting only those pixels in $c[m, n]$, currently set to zero and corresponding to a one in $x[m, n, g_i+dg]$, to $(2^B-1)\cdot(g_i-dg)-1$. The complement dot profile $x'[m, n, g_i+dg]$ is then generated using the algorithm illustrated in FIG. 11 and described as:

Step 1: Set the array $x'_1[m, n, g_i+dg]=x'[m, n, g]$. Set $k=1$.

Step 2: The array $x'_k[m, n, g_i+dg]$ has l pixels set to one, and each of these l pixels has coordinates within $x'_k[m, n, g_i+dg]$ denoted as $x'_i=[m_i, n_i]$ where $i=1, 2, \ldots, 1$. Given the green-noise pair correlation filter $R'(r, a, g+dg)$ which is not necessarily radially symmetric and which has a coarseness parameter $M'(g)$, the influence array $q'_k[m, n, g+dg]$ is calculated as:

$$q'_k[m, n, g+dg] = \prod_{i=1}^{l} R'\left(\sqrt{(m')^2 + (n')^2}, \arctan\frac{m'}{n'}, g+dg\right)$$

where $m'=\min\{|m-m_i|, M-|m-m_i|\}^2$ and $n'=\min\{|n-n_i|, N-|n-n_i|\}^2$.

Step 3: Multiply, on a pixel-by-pixel basis, the influence array $q'_k[m, n, g+dg]$ with an M×N white noise array $w[m, n]$ to obtain the profit array $p'_k[m, n, g+dg]$.

Step 4: Classify all pixels set to zero in $x'_k[m, n, g]$ that correspond to a zero in $c[m, n]$ and rank them according to their profits in $p'_k[m, n, g+dg]$ such that the highest ranked pixel is greater than or equal in vale to all other profit pixels in that class.

Step 5: Identify the pixel in the class with the highest rank, and set that pixel to one. Determine if a sufficient number of pixels are set to one in $x'_k[m, n, g+dg]$. If so, stop with the final dot profile $x'[m, n, g+dg]$ given by $x'_k[m, n, g+dg]$, otherwise set $k=k+1$ and return to Step 2.

Figure 11:
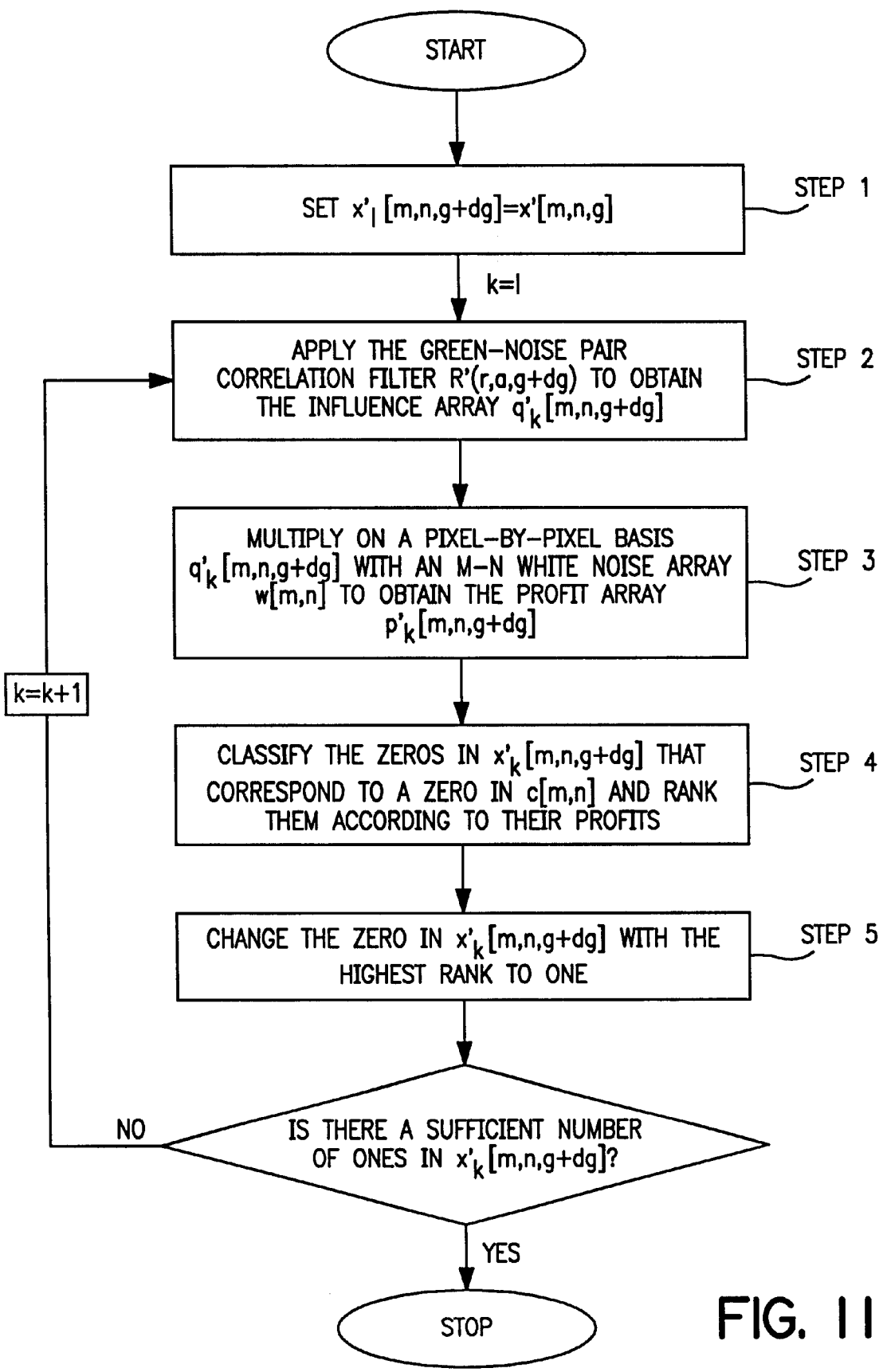
FIG. 11 is a flow chart showing the steps of Algorithm 7 for creating binary dot profile x'[m, n, g+dg] given x'[m, n, g] and in accordance with the first preferred embodiment of the present invention.
Figure 12:
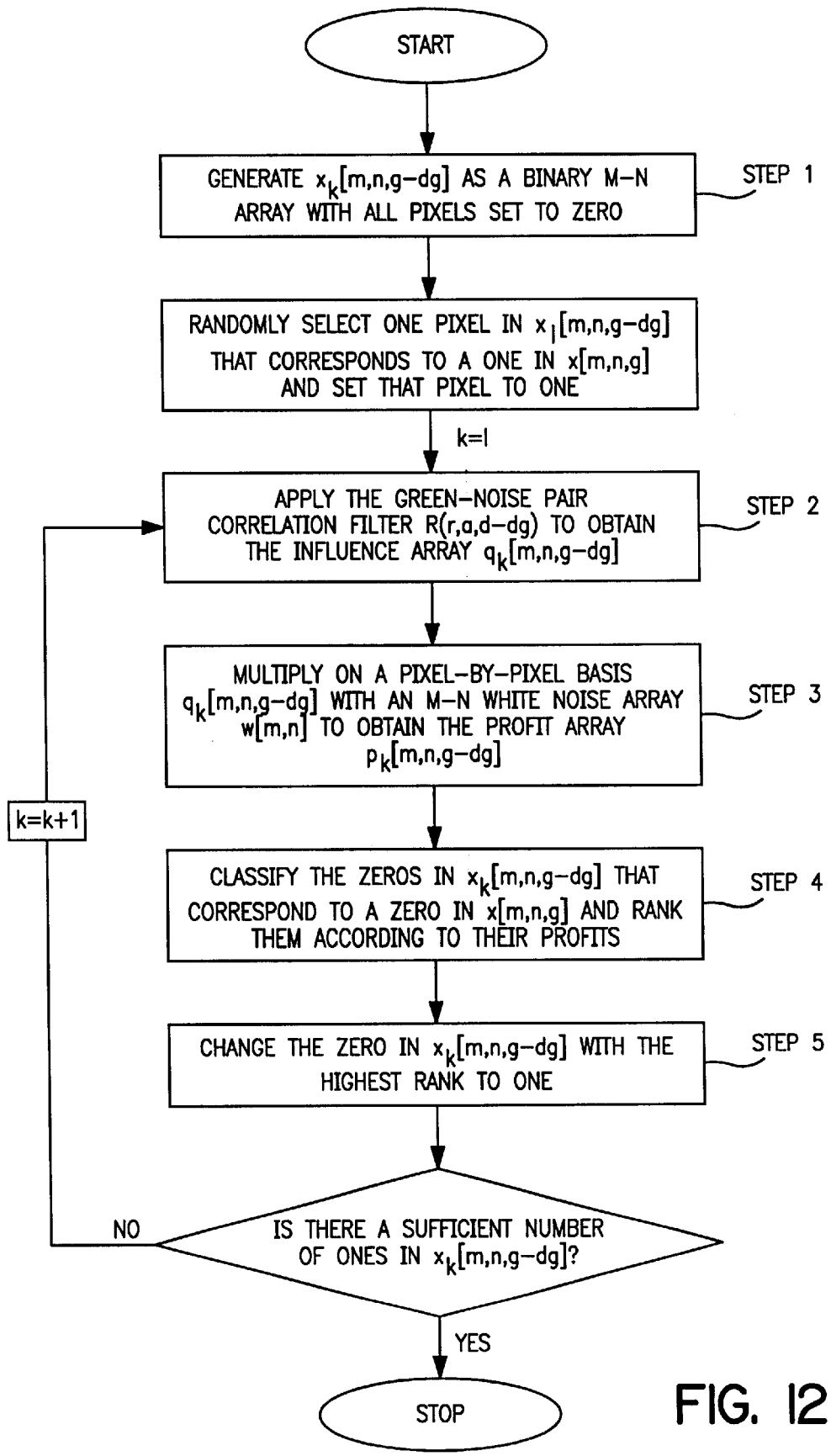
FIG. 12 is a flow chart showing the steps of Algorithm 8 for creating binary dot profile x[m, n, g−dg] given x[m, n, g] and in accordance with the first preferred embodiment of the present invention.

The cumulative array is then updated by replacing only those pixels in $c[m, n]$, currently set to zero and corresponding to a one in $x'[m, n, g_i+dg]$, to $2^B\cdot(1-g_i)-1$. The algorithms of FIGS. 9 and 11 are then repeated until the dot profiles for all gray levels $g_i+dg$ to $2^{B-1}$ (where ½ of the pixels in $x[m, n, g]$ are set to one and the remaining are set to zero.) Once complete, the remaining dot profiles $x[m, n, g]$ for gray levels from $g_i-dg$ to 0 are generated using the algorithm illustrated in FIG. 12 where $g=g_i$ and described as:

Step 1: Generate $x_1[m, n, g-dg]$ as a binary M×N array with all pixels set to zero. Randomly select one pixel of $x_1[m, n, g-dg]$ that corresponds to one in $x[m, n, g]$, and set that pixel to one. Set $k=1$.

Step 2: The array $x_k[m, n, g-dg]$ has k pixels set to one, and each of these k pixels has coordinates within $x_k[m, n, g-dg]$ denoted as $x_i=[m_i, n_i]$ where $i=1, 2, \ldots, k$. Given the green-noise pair correlation filter $R(r, a, g-dg)$, which is not necessarily radially symmetric and which has a coarseness parameter $M'(g)$, designed to create a dot profile with a pair correlation which approximates that of FIG. 3, the influence array $q_k[m, n, g-dg]$ is calculated as:

$$q_k[m, n, g-\mathrm{dg}] = \prod_{i=1}^{k} R\left(\sqrt{(m')^2 + (n')^2}, \arctan\frac{m'}{n'}, g-\mathrm{dg}\right)$$

where $m'=\min\{|m-m_i|, M-|m-m_i|\}^2$ and $n'=\min\{|n-n_i|, N-|n-n_i|\}^2$.

Step 3: Multiply, on a pixel-by-pixel basis, the influence array $q_k[m, n, g-dg]$ with an M×N white noise array $w[m, n]$ to obtain the profit array $p_k[m, n, g-dg]$.

Step 4: Classify all pixels set to zero in $x'_k[m, n, g-dg]$ that correspond to one in $x[m, n, g-dg]$ and rank them according to their profits in $p_k[m, n, g]$ such that the highest ranked pixel is greater than or equal in vale to all other profit pixels in that class.

Step 5: Identify the pixel in the class with the highest rank, and set that pixel to one. Determine if a sufficient number of pixels are set to one in $x_k[m, n, g-dg]$. If so, stop with the final dot profile $x[m, n, g-dg]$ given by $x_k[m, n, g-dg]$, otherwise set k=k+1 and return to Step 2.

The cumulative array is updated by setting only those pixels in c[n, n] that correspond to a one in x[m, n, g=dg] to $(2^B-1) \cdot (g-dg)-1$.

Figure 13:
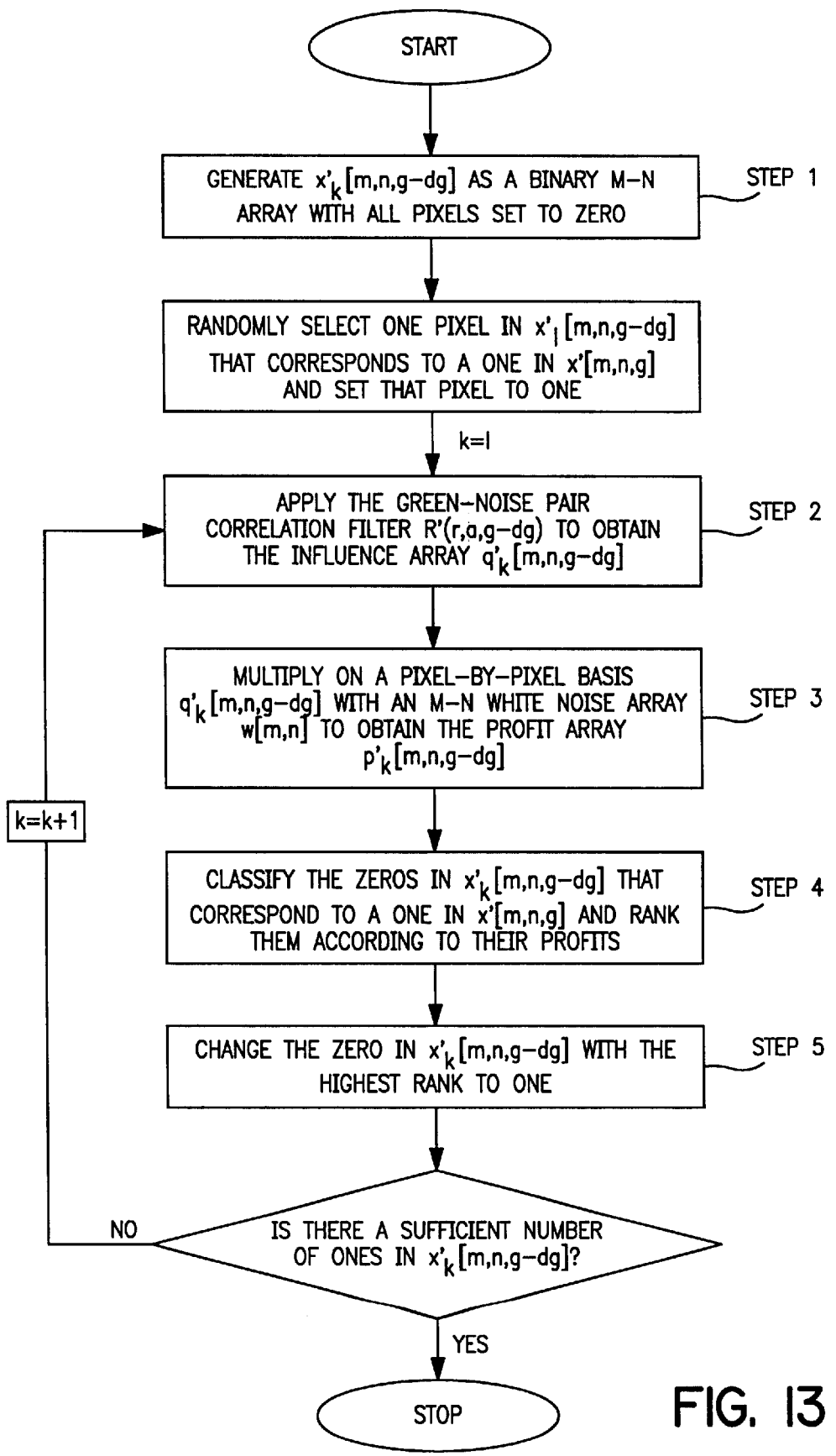
FIG. 13 is a flow chart showing the steps of Algorithm 9 for creating binary dot profile x'[m, n, g−dg] given x'[m, n, g] and in accordance with the first preferred embodiment of the present invention.

The remaining dot profile x'[m, n, g] for gray levels from g−dg to 0 are then generated using the algorithm of FIG. 13 and described as:

Step 1: Generate $x'_1[m, n, g-dg]$ as a binary M×N array with all pixels set to zero. Randomly select one pixel of $x'_1[m, n, g-dg]$ that corresponds to one in x'[m, n, g], and set that pixel to one. Set k=1.

Step 2: The array $x'_k[m, n, g-dg]$ has k pixels set to one, and each of these k pixels has coordinates within $x'_k[m, n, g-dg]$ denoted as $x'_i[m_i, n_i]$ where i=1, 2, ..., k. Given the green-noise pair correlation filter R'(r, a, g−dg), which is not necessarily radially symmetric and which has a coarseness parameter M'(g), designed t create a dot profile with a pair correlation which approximates that of FIG. 3, the influence array $q'_k[m, n, g-dg]$ is calculated as:

$$q'_k[m, n, g-\mathrm{dg}] = \prod_{i=1}^{k} R'\left(\sqrt{(m')^2 + (n')^2}, \arctan\frac{m'}{n'}, g-\mathrm{dg}\right)$$

where $m'=\min\{|m-m_i|, M-|m-m_i|\}^2$ and $n'=\min\{|n-n_i|, N-|n-n_i|\}^2$.

Step 3: Multiply, on a pixel-by-pixel basis, the influence array $q'_k[m, n, g-dg]$ with an M×N white noise array $w[m, n]$ to obtain the profit array $p'_k[m, n, g-dg]$.

Step 4: Classify all pixels set to zero in $x'_k[m, n, g-dg]$ that correspond to one in x'[m, n, g-dg] and rank them according to their profits in $p'_k[m, n, g]$ such that the highest ranked pixel is greater than or equal in vale to all other profit pixels in that class.

Step 5: Identify the pixel in the class with the highest rank, and set that pixel to one. Determine if a sufficient number of pixels are set to one in $x'_k[m, n, g-dg]$. If so, stop with the final dot profile x'[m, n, g−dg] given by $x'_k[m, n, g-dg]$, otherwise set k=k+1 and return to Step 2.

Figure 14:
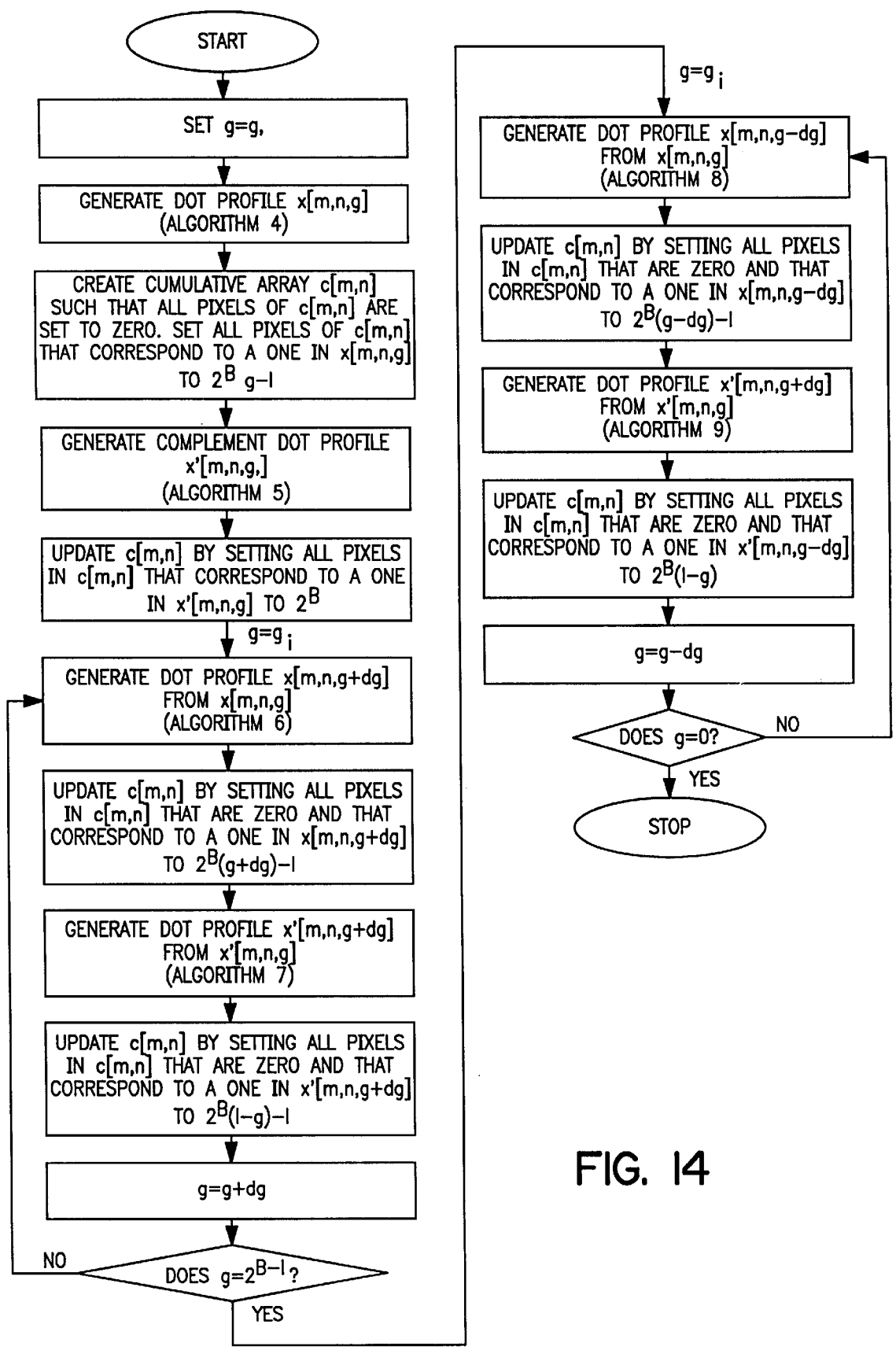
FIG. 14 is a flow chart showing the complete procedure (Spatial Domain Procedure 1) for constructing the green-noise mask in the spatial domain in accordance with the second preferred embodiment of the present invention.

Finally, the cumulative array us updated by setting only those pixels in c[m, n] that corresponds to a zero in x'[m, n, g−dg] and a one in x'[m, n, g] to $(2^B-1) \cdot (1-g)$. When the process has been implemented for all gray levels g, the cumulative array contains the desired green-noise dot profile for all levels, and is therefore the desired green-noise mask. The complete procedure just described for constructing the green-noise mask is given in FIG. 14.

a. Green-Noise Pair Correlation Filter

The green-noise pair correlation filter R(r, a, g) is a two-dimensional filter designed for gray level g such that R(r, a, g)>1 increases the likelihood of a pixel, currently set to zero and corresponding to a pixel currently set to one a distance r and direction a—π radians away (where a is in units of radians), being set to one. R(r, a, g)<1 decreases the likelihood of a pixel being set to one, while R(r, a, g)=0 completely inhibits a pixel from being set to one. In addition, R)(r, a, g)=1 neither increases nor decreases the likelihood of a pixel being set to one. In order to construct green-noise dither patterns having coarseness parameter M'(g), R(r, a, g) will generally follow the form of FIG. 3 for a constant a.

2. Spatial Domain Procedure No. 2

Figure 8:
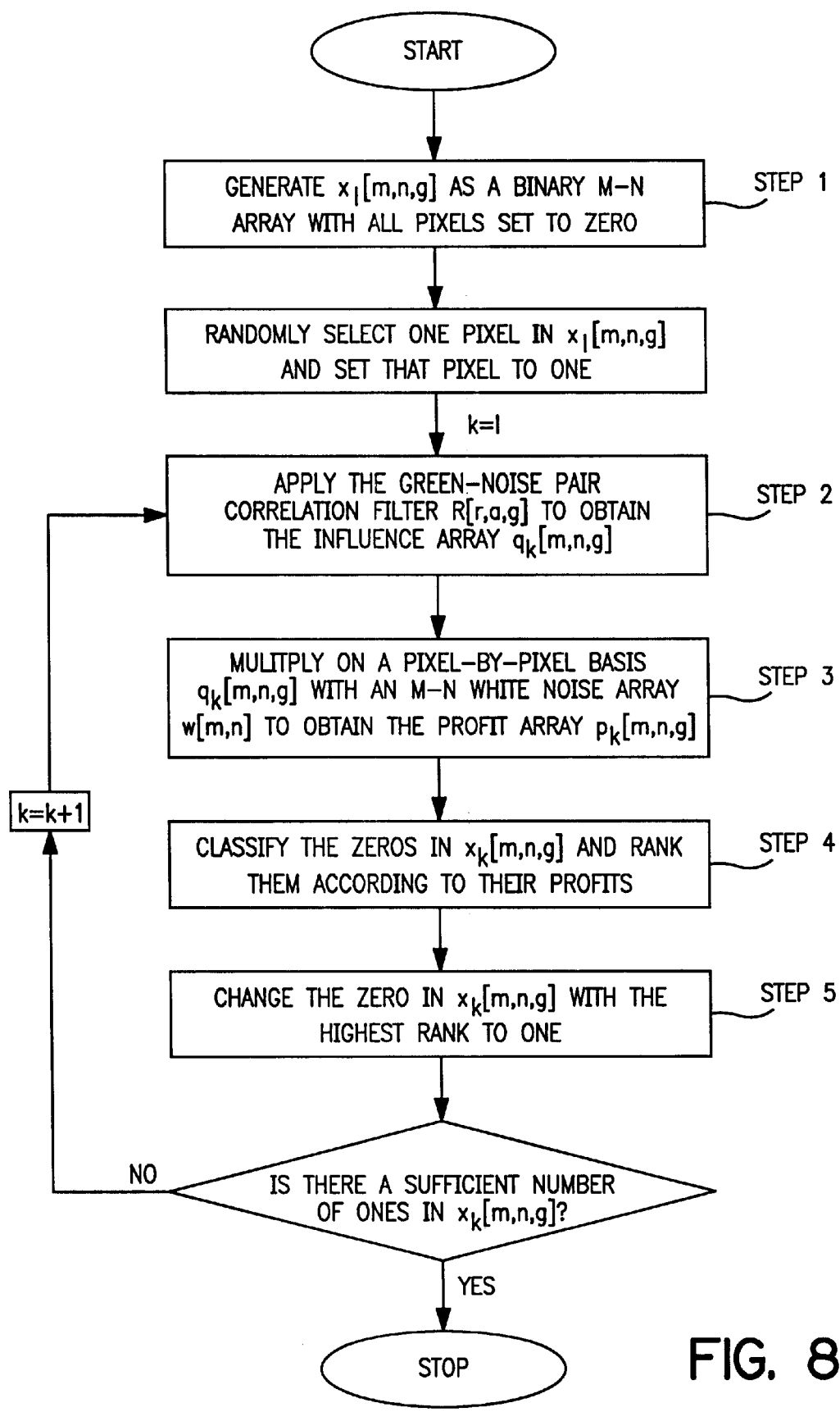
FIG. 8 is a flow chart showing the steps of Algorithm 4 for creating an initial binary dot profile having green-noise properties in accordance with a second preferred embodiment of the present invention.
Figure 15:
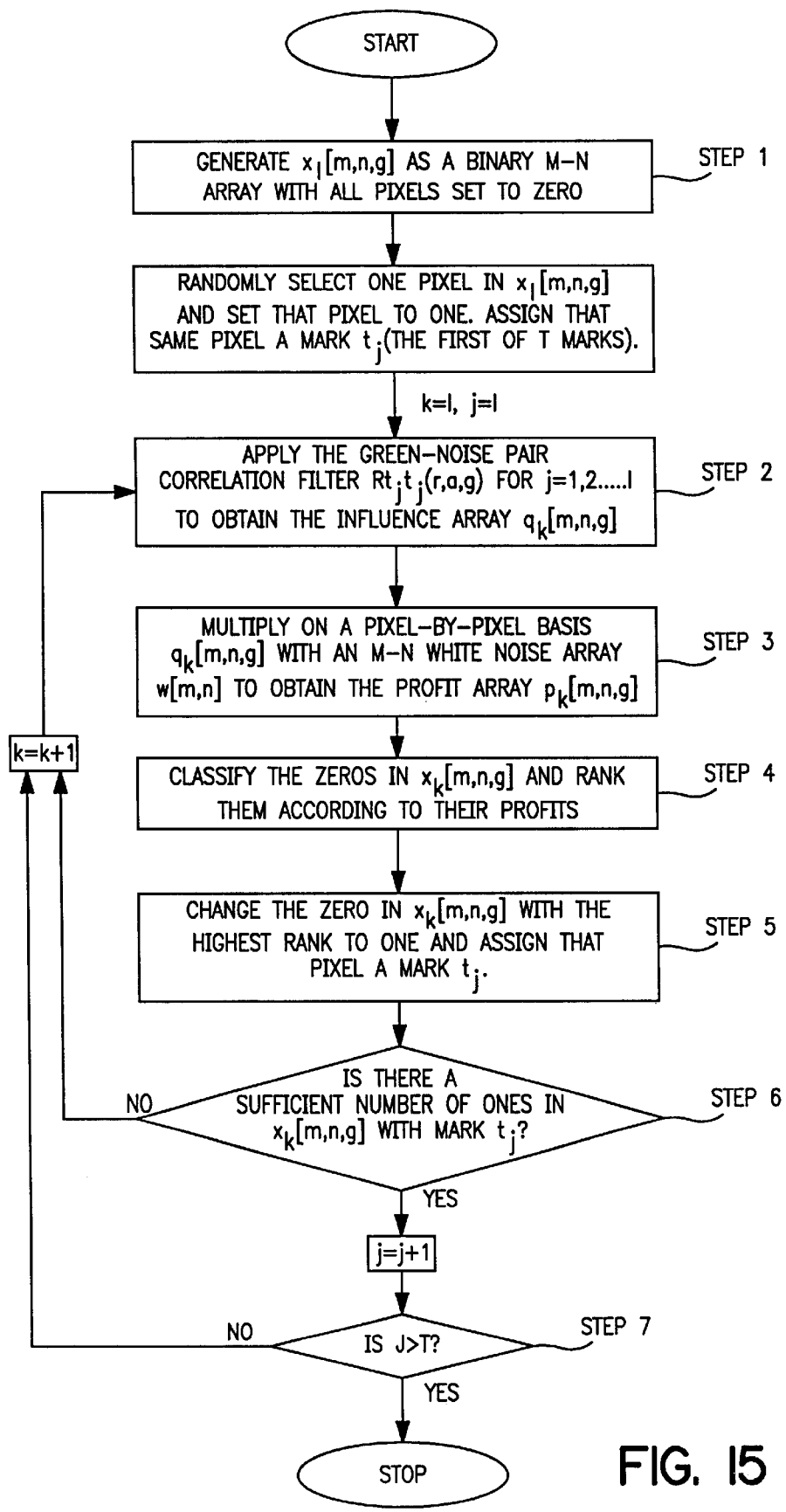
FIG. 15 is a flow chart illustrating the steps of Algorithm 10 for creating an alternative initial binary dot profile having green-noise properties for use with the first and second preferred embodiments of the present invention.

As a variation of the spatial domain procedure, FIG. 15 shows an alternate algorithm to replace the algorithm of FIG. 8 and is described as:

Step 1: Generate $x_1[m, n, g_c]$ as a binary M×N array with all pixels set to zero. Randomly select one pixel in $x_1[m, n, g]$ and set that pixel to one. Assign that pixel the mark $t_1$, the first of a total of T different marks. Set k=1.

Step 2: The array $x_k[m, n, g]$ has $l_j$ pixels set to one with mark $t_j$ such that $1 \le j \le J$, and each of these $l_j$ pixels has coordinates within $x_k[m, n, g]$ denoted as $x_{j,i}=[m_{j,i}, n_{j,i}]$, where i=1, 2, ..., $l_j$. Given the green-noise pair correlation filter $R_{tj,tj}$(r, a, g), with coarseness parameter M'(g), the influence array $q_k[m, n, g]$ is calculated as:

$$q_k[m, n, g] = \prod_{j=1}^{J} \prod_{i=1}^{l_j} R_{tJ,tj}\left(\sqrt{(m')^2 + (n')^2}, \arctan\frac{m'}{n'}, g\right)$$

where $m'=\min\{|m-m_{j,i}|, M-|m-m_{j,i}|\}^2$ and $n'=\min\{|n-n_{j,i}|, N-|n-n_{j,i}|\}^2$.

Step 3: Multiply, on a pixel-by-pixel basis, the influence array $q_k[m, n, g]$ with an M×N white noise array w[m, n] to obtain the profit array $p_k[m, n, g]$.

Step 4: Classify all pixels set to zero in $x_k[m, n, g]$ and rank them according to their profits in $p_k[m, n, g]$ such that the highest ranked pixel is greater than or equal in value to all other profit pixels in that class.

Step 5: Identify the pixel in the class with the highest rank, and set that pixel to one. Assign that same pixel a mark $t_j$.

Step 6: Determine if a sufficient number of pixels are set to one with mark $t_j$ in $x_k[m, n, g]$. If so, set J=J+1, the next mark in a set of T different marks, otherwise set k=k+1 and return to Step 2.

Step 7: If J>T (all marks assigned) then stop with the final dot profile x[m, n, g] given by $x_k[m, n, g]$, otherwise set k=k+1 and return to Step 2.

In a similar fashion to the algorithm of FIG. 8, the algorithms of FIGS. 9 and 11–13 can be modified to perform the calculation of the influence array $q_k[m, n, g]$ or $q_k[m, n, g]$ using the pair correlation filters $R_{ti,tj}$(r, a, g) or $R_{ti,tj}$(r, a, g) and marks tj for J=1, 2, ..., T.

a. Green-Noise Pair Correlation Filter

The green-noise pair correlation filter $R_{ti,tj}(r, a, g)$ is a two-dimensional filter designed for gray level g such that $R_{ti,tj}(r, a, g)>1$ increases the likelihood of a pixel, currently set to zero and corresponding to a pixel currently set to a distance r and direction a–π radians away with mark tj, being set to one with mark $t_i$. A pair correlation filter $R_{ti,tj}(r, a, g)<1$ decreases the likelihood of a pixel begin set to one with mark $t_i$, while $R_{ti,tj}(r, a, g)=0$ completely inhibits a pixel from being set to one with mark $t_i$. In addition, $R_{ti,tj}(r, a, g)=1$ neither increases nor decreases the likelihood of a pixel being set to one with mark $t_i$. In general, $R_{ti,tj}(r, a, g)$ will not equal $R_{ti,tj}(r, a, g)$ for i≠j.

3. Spatial Domain Procedure No. 3

As a modification to the algorithm of FIG. 8, Step 2 may be performed in the spatial domain using an appropriately designed finite impulse response (FIR) filter and circular convolution in two dimensions. It may also be performed in the spectral domain as described in steps 2, 3, and 4 of the algorithm of FIG. 4. This modification may also be made to the algorithms of FIGS. 9, 10–13 and 15.

4. Spatial Domain Procedure No. 4

The green-noise mask, GNM, of the present invention can also be constructed as follows. First, for each discrete gray-level g, construct a binary dot-profile $X_g$ such that as close to M×N×g pixels are set to one with all others set to zero and for all gray-levels r and s such that r<s, the binary pixel x[m,n,s] of dot-profile $X_s$ is set to one if the binary pixel x[m,n,r] of dot-profile $X_r$ is set to one. This condition is referred to as the stacking constraint. Second, the green-noise mask is determined by adding all dot-profiles together in a pixel-wise fashion and then dividing by the total number of discrete gray-levels such that:

$$GNM[m, n] = \Sigma_g x[m,n,g]/(2^B-1).$$

Note that with the exception of g=0 where x[m,n,g]=0 for all m and n which is constructed first and with the exception of g=1 where x[m,n,g]=1 for all m and n which is constructed second, the dot-profiles can be constructed in any order.

The procedure for constructing the binary dot-profiles $X_g$ for 0<g<½ is described as follows:

Step 1: Given $X_r$, the previously constructed dot-profile such that r is the maximum gray-level less than g which corresponds to a dot-profile constructed prior to constructing $X_g$, initialize each pixel, x[m,n,g], in $X_g$ such that x[m,n,g]=x[m,n,r] for m and n.

Step 2: Initialize U to an M×N white-noise array.

Step 3: Given the green-noise pair correlation filter R(r, a,g), which is not necessarily radially symmetric and with coarseness parameter M'(g), rescale each pixel U[m,n] in U, for each pixel $x[m_j,n_j,g]$ in $X_g$ such that $x[m_j,n_j,g]=1$ and:

$$U[m, n] = U[m, n] \times R\left(\sqrt{(m')^2 + (n')^2}, \arctan\frac{m'}{n'}, g\right)$$

where $m'=\min\{|m-m_i|, M-|m-m_i|\}^2$ and $n'=\min\{|n-n_i|, N-|n-n_i|\}^2$.

Step 4: Calculate the M×N array D as the output applying a low-pass filter to $X_g$ using circular convolution.

Step 5: Calculate the M×N array E from D such that E[m,n]=f(D[m,n]) where the function f(x) is any function where f(x)>0 for x>0 and $f(x_0)>f(x_1)$ for $x_0<x_1$.

Step 6: Given $X_s$, the previously constructed dot-profile such that s is the minimum gray-level greater than g which corresponds to a dot-profile constructed prior to constructing $X_g$, choose the pixel $x_i=[m_i,n_i]$ in $X_g$ such that $x_i=0$, $x[m_i,n_i,r)]=1$, and the product $U[m_i,n_i] \times E[m_i, n_i]$ is greater than or equal to any other product $U[o, p] \times E[o,p]$ where x[o,p,g]=0 and x[o,p,r]=1. Set that chosen pixel to 1.

Step 7: Given the green-noise pair correlation filter R(r, a,g), which is not necessarily radially symmetric and with coarseness parameter M'(g), rescale each pixel U[m,n] in U, for the pixel $x[m_i,n_i,g]$ in $X_g$, such that:

$$U[m, n] = U[m, n] \times R\left(\sqrt{(m')^2 + (n')^2}, \arctan\frac{m'}{n'}, g\right)$$

where $m'=\min\{|m-m_i|, M-|m-m_i|\}^2$ and $n'=\min\{|n-n_i|, N-|n-n_i|\}^2$.

Step 8: If the number of pixels in $X_g$ set to one is as close to M×N×g as possible then the construction of $X_g$ is complete, otherwise return to step 4.

The procedure for constructing the binary dot-profiles $X_g$ for ½≤g<1 is described as follows:

Step 1: Given $X_s$, the previously constructed dot-profile such that s is the minimum gray-level greater than g which corresponds to a dot-profile constructed prior to constructing $X_g$, initialize each pixel, x[m,n,g], in $X_g$ such that x[m,n,g]=x[m,n,s] for m and n.

Step 2: Initialize U to an M×N white-noise array.

Step 3: Given the green-noise pair correlation filter R(r, a,g), which is not necessarily radially symmetric and with coarseness parameter M'(g), rescale each pixel U[m,n] in U, for each pixel $x[m_i,n_i,g]$ in $X_g$ such that $x[m_i,n_i,g]=0$ and:

$$U[m, n] = U[m, n] \times R\left(\sqrt{(m')^2 + (n')^2}, \arctan\frac{m'}{n'}, g\right)$$

where $m'=\min\{|m-m_i|, M-|m-m_i|\}^2$ and $n'=\min\{|n-n-n_i|\}^2$.

Step 4: Calculate the M×N array D as the output applying a low-pass filter to $X_g$ using circular convolution.

Step 5: Calculate the M×N array E from D such that E[m,n]=f(D[m,n]) where the function f(x) is any function where f(x)>0 for x>0 and $f(x_0)>f(x_1)$ for $x_0<x_1$.

Step 6: Given $X_r$, the previously constructed dot-profile such that r is the maximum gray-level less than g which corresponds to a dot-profile constructed prior to constructing $X_g$, choose the pixel $x_i=[m_i,n_i]$ in $X_g$ such that $x_i=1$, $x[m_i,n_i,r]=0$, and the product $U[m_i,n_i] \times E[m_i,n_i]$ is greater than or equal to any other product $U[o,p] \times E[o, p]$ where x[o,p,g]=1 and x[o,p,r]=0. Set that chosen pixel to 0.

Step 7: Given the green-noise pair correlation filter R(r, a,g), which is not necessarily radially symmetric and with coarseness parameter M'(g), rescale each pixel U[m,n] in U, for the pixel $x[m_i,n_i,g]$ in $X_g$, such that:

$$U[m, n] = U[m, n] \times R\left(\sqrt{(m')^2 + (n')^2}, \arctan\frac{m'}{n'}, g\right)$$

where $m'=\min\{|m-m_i|, M-|m-m_i|\}^2$ and $n'=\min\{|n-n_i|, N-|n-n_i|\}^2$.

Step 8: If the number of pixels in $X_g$ set to one is as close to M×N×g as possible then the construction of $X_g$ is complete, otherwise return to step 5.

5. Spatial Domain Procedure No. 5

A green-noise mask can also be constructed for color halftoning where more than one ink or color component is used to create the illusion of continuous shades of color. Some examples which such a green-noise mask may be used include, but are not limited to, color display devices that use red, green, and blue light, and color printers that print cyan, magenta, yellow, and sometimes black inks.

Without loss of generality, the green-noise mask for color is designed for halftoning color images composed of C different color components, with GNM[m,n,c] representing a single pixel of the green-noise mask (GNM), with row and column coordinates m and n and corresponding to color component c. Also, a pixel of the display device or color printer will be composed of C different color components with the component c set to 1 (one) if the component c of the corresponding pixel of the input image has an intensity greater than to the component c of the corresponding pixel of the green-noise mask.

The c component of the green-noise mask is constructed as follows: first, for each discrete color-level g of component c, construct a binary dot-profile $X_{c,g}$ such that as close to M×N×g pixels are set to one with all others set ro zero and for all color-levels r and s such that r<s, the binary pixel x[m,n,s] of dot-profile $X_{c,s}$ is set to one if the binary pixel x[m,n,r] of dot-profile $X_{c,r}$ is set to one. The condition that if x[m,n,r]=1 then x[m,n,s]=1 for r<s is referred to as the stacking constraint. The green-noise mask for color component c is then determined by adding all dot-profiles together in a pixel-wise fashion then dividing by the total number of discrete color-levels such that:

$$GNM[m,n,c] = \Sigma_g x[m,n,c,g]/(2^B-1).$$

Note that with the exception of g=0 where x[m,n,g]=0 for all m and n which is constructed first, and with the exception of g=1 where x[m,n,g]=1 for all m and n which is constructed second, the dot-profiles can be constructed in any order.

In the green-noise mask for color, the arrangement of on pixels for color component c can influence the arrangement of on pixels for all other colors. However, where the arrangement of on pixels in any color component does not affect the arrangement of on pixels for other components, then the dot profiles $X_{c,g}$ for each color component can be constructed according to the algorithms in Spatial Domain Procedure No. 4 for constructing the dot-profile $X_g$. If the arrangement of on pixels in color component c is to influence the arrangement of on pixels in other colors, then a new algorithm is required and is described as follows for constructing dot-profiles for color-level g, such that 0<g<½:

- Step 1: Given $X_{1,r}, X_{2,r}, \ldots X_{c,r}$, the previously constructed dot-profiles for each color component such that r is the maximum color-level less than g which corresponds to a dot-profile constructed prior to constructing $X_{1,r}, X_{2,r}, \ldots X_{c,r}$, initialize, for each color component c, each pixel, x[m,n,c,g], in $X_{c,g}$ such that x[m,n,c,g]=x[m,n,c,r] for all m and n.
- Step 2: For each color component c, create an M×N white-noise array $U_c$.
- Step 3: For each color component c, given the green-noise pair correlation filter $R_c(r,a,c)$ for color component c, which is not necessarily radially symmetric and with coarseness parameter $M'_c(g)$, rescale each pixel $U_c[m,n]$ in $U_c$, for each pixel $x[m_i,n_i,c,g]$ in $X_{c,g}$ such that $x[m_i,n_i,c,g]=1$ and:

$$U_c[m,n] = U_c[m,n] \times R_c\left(\sqrt{(m')^2+(n')^2}, \arctan\frac{m'}{n'}, g\right)$$

where $m'=\min\{|m-m_i|, M-|m-m_i|\}^2$ and $n'=\min\{|n-n_i|, N-|n-n_i|\}^2$.

- Step 4: For each combination of color components c and d such that c≠d, given the green-noise pair correlation filter $R_{c,d}(r,a,g)$ between color components c and d, which is not necessarily radially symmetric, rescale each pixel $U_c[m,n]$ in $U_c$, for each pixel $$U_c[m,n] = U_c[m,n] \times R_{c,d}\left(\sqrt{(m')^2+(n')^2}, \arctan\frac{m'}{n'}, g\right)$$

where $m'=\min\{|m-m_i|, M-|m-m_i|\}^2$ and $n'=\min\{|n-n_i|, N-|n-n_i|\}^2$.

- Step 5: For each color component c, create the M×N array $D_c$ as the output after applying a low-pass filter to $X_{c,g}$ using circular convolution.
- Step 6: For each color component c, create the M×N array $E_c$ from $D_c$ such that $E_c[m,n]=f_c(D_c[m,n])$ where the function $f_c(x)$ is any function where $f_c(x)>0$ for x>0 and $f_c(x_0)>f_c(x_1)$ for $x_0<x_1$.
- Step 7: For each color component c, given $X_{c,s}$, the previously constructed dot-profile for color component c such that s is the minimum color-level greater than g which corresponds to a dot-profile constructed prior to constructing $X_{c,g}$, choose the pixel $x[m_i,n_i,c,g]$ in $X_{c,g}$ such that $x[m_i,n_i,c,g]=0$, $x[m_i,n_i,c,r]=1$, and the product $U_c[m_i,n_i] \times E_c[m_i,n_i]$ is greater than or equal to any other product $U_c[o,p] \times E_c[o,p]$ where x[o,p,c,g]=0 and x[o,p,c,r]=1. Set that chosen pixel to 1.
- Step 8: For each color component c, given the green-noise pair correlation filter $R_c(r,a,g)$ for color component c, which is not necessarily radially symmetric and with coarseness parameter $M'_c(g)$, rescale each pixel $U_c[m,n]$ in $U_c$, for the most recently converted pixel $x[m_i,n_i,c,g]$ in $X_{c,g}$ such that:

$$U_c[m,n] = U_c[m,n] \times R_c\left(\sqrt{(m')^2+(n')^2}, \arctan\frac{m'}{n'}, g\right)$$

where $m'=\min\{|m-m_i|, M-|m-m_i|\}^2$ and $n'=\min\{|n-n_i|, N-|n-n_i|\}^2$.

- Step 9: For each combination of color components c and d such that c≠d, given the green-noise pair correlation filter $R_{c,d}(r,a,g)$ between color components c and d, which is not necessarily radially symmetric, rescale each pixel $U_c[m,n]$ in $U_c$, for the most recently converted pixel $x[m_i,n_i,c,g]$ in $X_{c,g}$ such that:

$$U_c[m,n] = U_c[m,n] \times R_{c,d}\left(\sqrt{(m')^2+(n')^2}, \arctan\frac{m'}{n'}, g\right)$$

where $m'=\min\{|m-m_i|, M-|m-m_i|\}^2$ and $n'=\min\{|n-n_i|, N-|n-n_i|\}^2$.

- Step 10: For each color component c, if the number of pixels in $X_{c,g}$ set to one is as close to M×N×g as possible then the construction of $X_{c,g}$ is complete, otherwise return to step 5.

For constructing dot-profiles for color-level g such that ½≤g<1, the algorithm is described as follows:

Step 1: Given $X_{1,s}$, $X_{2,s}$, ... $X_{c,s}$, the previously constructed dot-profiles for each color component such that s is the minimum color-level greater than g which corresponds to a dot-profile constructed prior to constructing $X_{1,g}$, $X_{2,g}$, ... $X_{c,g}$, initialize, for each color component c, each pixel, x[m,n,c,g], in $X_{c,g}$ such that x[m,n,c,g]=x[m,n,c,s] for all m and n.

Step 2: For each color component c, create an M×N white-noise array $U_c$.

Step 3: For each color component c, given the green-noise pair correlation filter $R_c(r,a,g)$ for color component c, which is not necessarily radially symmetric and with coarseness parameter $M'_c(g)$, rescale each pixel $U_c[m,n]$ in $U_c$, for each pixel $x[m_i,n_i,c,g]$ in $X_{c,g}$ such that $x[m_i,n_i,c,g]=0$ and:

$$U_c[m,n] = U_c[m,n] \times R_c\left(\sqrt{(m')^2 + (n')^2}, \arctan\frac{m'}{n'}, g\right)$$

where m'=min{|m−$m_i$|, M−|m−$m_i$|}² and n'=min{|n−$n_i$|, N−|n−$n_i$|}².

Step 4: For each combination of color components c and d such that c≠d, given the green-noise pair correlation filter $R_{c,d}(r,a,g)$ between color components c and d, which is not necessarily radially symmetric, rescale each pixel $U_c[m,n]$ in $U_c$, for each pixel $x[m_i,n_i,d,g]$ in $X_{d,g}$ such that $x[m_i,n_i,d,g]=0$ and:

$$U_c[m,n] = U_c[m,n] \times R_{c,d}\left(\sqrt{(m')^2 + (n')^2}, \arctan\frac{m'}{n'}, g\right)$$

where m'=min{|m−$m_i$|, M−|m−$m_i$|}² and n'=min{|n−$n_i$|, N−|n−$n_i$|}².

Step 5: For each color component c, create the M×N array $D_c$ as the output after applying a low-pass filter to $X_{c,g}$ using circular convolution.

Step 6: For each color component c, create the M×N array $E_c$ from $D_c$ such that $E_c[m,n]f_c(D_c[m,n])$ where the function $f_c(x)$ is any function where $f_c(x)>0$ for $x>0$ and $f_c(x_0)>f_c(x_1)$ for $x_0<x_1$.

Step 7: For each color component c, given $X_{c,r}$, the previously constructed dot-profile for color component c such that r is the maximum color-level less than g which corresponds to a dot-profile constructed prior to constructing $X_{c,g}$, choose the pixel $x[m_i,n_i,c,g]$ in $X_{c,g}$ such that $x[m_i,n_i,c,g]=1$, $x[m_i,n_i,c,r]=0$, and the product $U_c[m_i,n_i] \times E_c[m_i,n_i]$ is greater than or equal to any other product $U_c[o,p] \times E_c[o,p]$ where x[o,p,c,g]=1 and x[o,p,c,r]=0. Set that chosen pixel to 0.

Step 8: For each color component c, given the green-noise pair correlation filter $R_c(r,a,g)$ for color component c, which is not necessarily radially symmetric and with coarseness parameter $M'_c(g)$, rescale each pixel $U_c[m,n]$ in $U_c$, for the most recently converted pixel $x[m_i,n_i,c,g]$ in $X_{c,g}$, such that:

$$U_c[m,n] = U_c[m,n] \times R_c\left(\sqrt{(m')^2 + (n')^2}, \arctan\frac{m'}{n'}, g\right)$$

where m'=min{|m−$m_i$|, M−|m−$m_i$|}² and n'=min{|n−$n_i$|, N−|n−$n_i$|}².

Step 9: For each combination of color components c and d such that c≠d, given the green-noise pair correlation filter $R_{c,d}(r,a,g)$ between color components c and d, which is not necessarily radially symmetric, rescale each pixel $U_c[m,n]$ in $U_c$, for the most recently converted pixel $x[m_i,n_i,d,g]$ in $X_{d,g}$ such that:

$$U_c[m,n] = U_c[m,n] \times R_{c,d}\left(\sqrt{(m')^2 + (n')^2}, \arctan\frac{m'}{n'}, g\right)$$

where m'=min{|m−$m_i$|, M−|m−$m_i$|}² and n'=min{|n−$n_i$|, N−|n−$n_i$|}².

Step 10: For each color component c, if the number of pixels in $X_{c,g}$ set to one is as close to M×N×g as possible then the construction of $X_{c,g}$ is complete, otherwise return to step 5.

The green-noise pair correlation filter $R_{c,d}(r,a,g)$ between colors c and d is a two-dimensional filter designed for color-level g such that $R_{c,g}(r,a,g)>1$ increases the likelihood of a pixel, currently set to zero in color component c and corresponding to a pixel in color component d currently set to one a distance r and a direction a−π radian away (where a is in units of radians), being set to one. $R_{c,g}(r,a,g)<1$ decreases the likelihood of pixel being set to one, while $R_{c,d}(r,a,g)=0$ completely inhibits a pixel from being set to one. In addition, $R_{c,d}(r,a,g)=1$ neither increases nor decreases the likelihood of a pixel being set to one.

Figure 16:
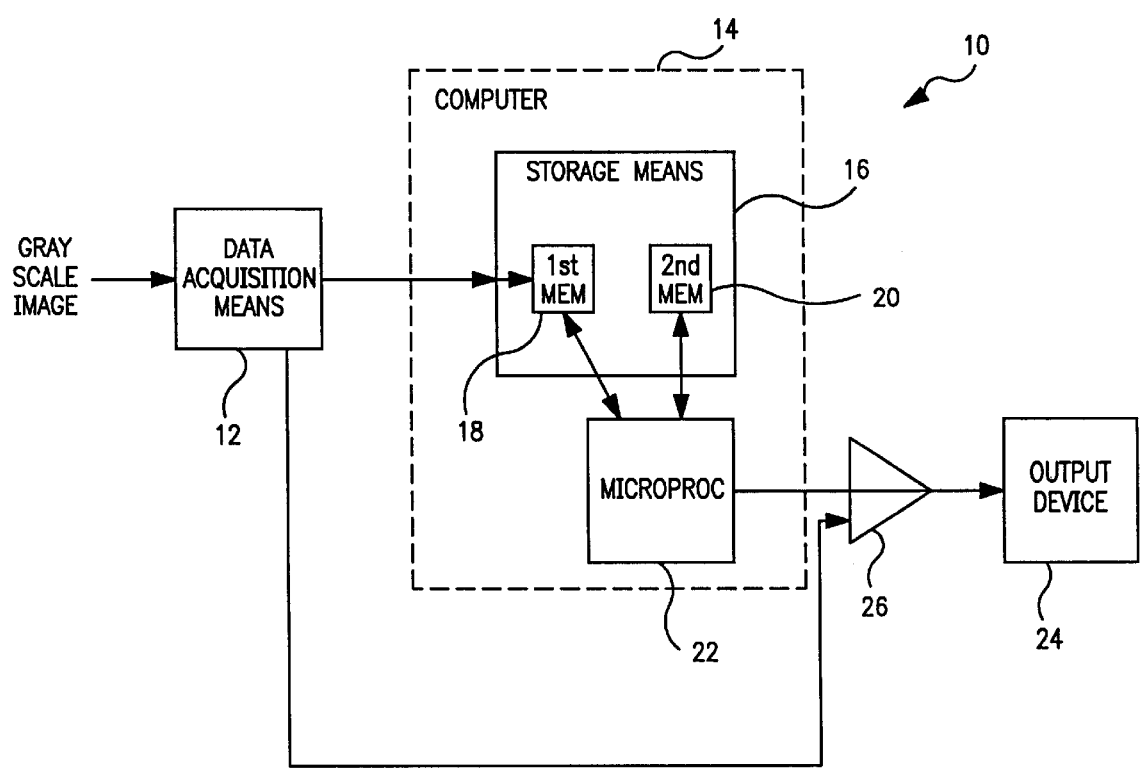
FIG. 16 is a schematic block diagram of a hardware system for digitally implementing halftoning using the green-noise mask in accordance with the present invention.

FIG. 16 shows an example of the hardware 10 which may be used for digital implementation of halftoning using the green-noise masks of the present invention. It should be noted that the hardware implementation can by either digital or analog. As shown in FIG. 16, a gray-scale image is acquired using a data acquisition means 12. Data acquisition means 12 acquires the gray-scale image to create a gray-scale image array on a pixel-by-pixel basis. Data acquisition mean 12 may be a scanner for scanning the gray-scale image and converting the pixels of the image from an array of f(x, y) to the gray-scale image array f(i, j). Data acquisition means 12 may also comprise a copier machine or a computer storing the gray-scale image.

The gray-scale image array is preferably stored in a storage means 16 of a computer 14. Storage means 16 preferably is a hard-disk drive of the computer, but may also comprise a CD ROM storage medium or a floppy disk. For ease of reference, storage means 16 is shown in FIG. 16 as having a first memory unit 18 and a second memory unit 20. In terms of a hard disk, a memory unit comprises a location on the hard disk for electronically storing data. The gray-scale image array is thus preferably stored in first memory unit 18.

Computer 14 may be any conventional personal computer, and thus a microprocessor 22 is any microprocessor used with such conventional computers. Creation of the green-noise mask is performed in accordance with the algorithms described above, wherein the algorithms are preferably stored and executed in an external, conventional computer. The green-noise mask is subsequently stored in second memory unit 20 and preferably produces a pixel-by-pixel comparison of the gray-scale image.

The green-noise mask array is provided to microprocessor 22 where it is compared, on a pixel-by-pixel basis, to the value of each corresponding pixel in the gray-scale image array so to produce a binary image array. Microprocessor 22 converts the binary image array to a halftone image, as is conventionally done in the art. The halftone image is then provided to an output device 24, via a comparator 26, for display. Output device 24 may be any one of a laser printer, ink-jet printer, a thermal printer, a thermal wax printer, a dye-sublimation printer, a bubble jet printer, a facsimile machine, or a similar device.

It will be apparent to those skilled in the art that various modifications and variations can be made in the green-noise mask of the present invention and in construction of this green-noise mask without departing from the scope or spirit of the invention. As an example, the present invention can be modified for a method of generating and utilizing the green-noise mask for color halftoning by independently thresholding at least one of the component colors, such as but not limited to cyan, magenta, yellow and black, against the green-noise mask and then over-printing the halftone component color images. The green-noise mask can also be shifted, rotated, or flipped (both horizontally and/or vertically) before it is used on each of the different color planes. In that manner, the color energy is spread out over a larger space. Finally, the green-noise halftoning of the present invention can also be implemented in any other application currently using blue-noise masks, such as, for example, ink jet printers.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for producing a halftone image from a gray-scale image in a computing means, the method comprising the steps of:

acquiring the gray-scale image to create a gray-scale image array on a pixel-by-pixel basis;

storing the gray-scale image array in a first memory of the computing means;

utilizing a pixel-by-pixel comparison of the gray-scale image against a green-noise mask array stored in a second memory of the computing means;

comparing, on a pixel-by-pixel basis, the value of each corresponding pixel in the gray-scale image array to produce a binary image array; and converting the binary image array to the halftone image.

2. An apparatus for producing a halftone image from a gray-scale image, the apparatus comprising:

a data acquisition means for acquiring the gray-scale image to create a gray-scale image array on a pixel-by-pixel basis;

storage means for storing the gray-scale image array in a first memory of a computing means;

a green-noise mask stored in a second memory of the computing means, the green-noise mask producing a pixel-by-pixel comparison of the gray-scale image;

comparing means for comparing, on a pixel-by-pixel basis, the value of each corresponding pixel in the gray-scale image array to produce a binary image array; and converting means for converting the binary image array to the halftone image.

3. A method for producing a green-noise mask for use in a method for producing a halftone image from a gray-scale image comprised of pixels, the green-noise mask production method comprising the step of:

generating a sequence of binary dot profiles under a stacking constraint, wherein pixels are turned "on" in a dot profile of a gray level g and remain "on" for all dot profiles corresponding to higher values of the gray level g, and the dot profile corresponding to the gray level g has a radially averaged power spectrum with little or no low frequency components, a high frequency component that diminishes with an increasing coarseness parameter M'(g), and a sharp spectral peak at approximately the radial frequency $f_g$ where:

$$f_g = \frac{\sqrt{\frac{g}{M'(g)}}}{R}, \text{ for } 0 < g \leq 0.5$$

$$\frac{\sqrt{\frac{(1-g)}{M'(g)}}}{R}, \text{ for } 0.5 < g \leq 1.0,$$

wherein R is the minimum distance between addressable points, M'(g) is the coarseness parameter for gray level g, and the dot profile corresponding to the gray level g has a pair correlation with a non-zero value at radial distance r near zero and peaks at integer multiples of the radial distance $\lambda_g$ where:

$$\lambda_g = \frac{R}{\sqrt{\frac{g}{M'(g)}}}, \text{ for } 0 < g \leq 0.5$$

$$\frac{R}{\sqrt{\frac{(1-g)}{M'(g)}}}, \text{ for } 0.5 < g \leq 1.0.$$

4. A method for producing a green-noise mask for use in a method for producing a halftone image from a gray-scale image, the green-noise mask production method comprising the step of, based upon a sequence of binary dot profiles which satisfy a stacking constraint, assigning to each element of the green-noise mask a value defined by a gray level at which a corresponding pixel in the sequence of binary dot profiles is turned "on."

5. A green-noise mask for use in a method for producing a halftone image from a gray-scale image, the green-noise mask comprising:

an array of deterministic numerical values such that when the array is thresholded with a pixel-by-pixel comparison of the array with a gray level g such that each pixel of the resulting dot profile which corresponds to a pixel in the array which is less than g is turned "on" and otherwise is turned "off," wherein the resulting dot profile has a radially averaged power spectrum with little or no low frequency components, a high frequency component that diminishes with an increasing coarseness parameter M'(g), and a sharp spectral peak at approximately the radial frequency $f_g$ where:

$$f_g = \frac{\sqrt{\frac{g}{M'(g)}}}{R}, \text{ for } 0 < g \leq 0.5$$

$$\frac{\sqrt{\frac{(1-g)}{M'(g)}}}{R}, \text{ for } 0.5 < g \leq 1.0,$$

wherein R is the minimum distance between addressable points, M'(g) is the coarseness parameter for gray level g, and the dot profile corresponding to the gray level g has a pair correlation with a non-zero value at radial distance r near zero and peaks at integer multiples of the radial distance $\lambda_g$ where:

$$\lambda_g = \frac{R}{\sqrt{\frac{g}{M'(g)}}}, \text{ for } 0 < g \le 0.5$$

$$\frac{R}{\sqrt{\frac{(1-g)}{M'(g)}}}, \text{ for } 0.5 < g \le 1.0.$$

6. An apparatus for producing a color halftone image from a series of gray-scale images, wherein each gray-scale image corresponds to each color component of the color halftone image, the apparatus comprising:
   a data acquisition means for acquiring any one of the series of gray-scale images to create a gray-scale image array on a pixel-by-pixel basis;
   storage means for storing the gray-scale image array in a first memory of a computing means;
   a green-noise mask stored in a second memory of the computing means, the green-noise mask producing a pixel-by-pixel comparison of each gray-scale image;
   comparing means for comparing, on a pixel-by-pixel basis, the value of each corresponding pixel in the gray-scale image array to produce a binary image array; and
   converting means for converting the binary image array to the halftone image.

7. A machine comprising:
   a computer readable storage device which stores a dither matrix for use in halftoning image information; and
   a comparator responsive to the computer readable storage device, the dither matrix having at least one array that, when thresholded at a number of levels, produces a number of dot profiles, wherein a plurality of the number of dot profiles each have a power spectrum substantially characteristic of a green noise power spectrum for the level at which such dot profile is produced.

8. The machine of claim 7, wherein the computer readable storage device comprises a computer memory.

9. The machine of claim 7, wherein a majority of the number of dot profiles have a power spectrum substantially characteristic of a green noise power spectrum for the level at which such dot profile is produced.

10. The machine of claim 7, wherein substantially all of the number of dot profiles have a power spectrum substantially characteristic of a green noise power spectrum for the level at which such dot profile is produced.

11. A machine comprising:
    a computer readable storage device which stores a dither matrix for use in halftoning image information; and
    a comparator responsive to the computer readable storage device, the dither matrix having at least one array, that, when threshold at a number of levels, produces a number of dot profiles, wherein a plurality of the number of dot profiles each have a pair correlation substantially characteristic of a green noise pair correlation for the level at which such dot profile is produced.

12. The machine of claim 11, wherein the computer readable storage device comprises a computer memory.

13. The machine of claim 11, wherein a majority of the number of dot profiles have a pair correlation substantially characteristic of a green noise pair correlation for the level at which such dot profile is produced.

14. The machine of claim 11, wherein substantially all of the number of dot profiles have a pair correlation substantially characteristic of a green noise pair correlation for the level at which such dot profile is produced.

15. A machine comprising:
    a computer readable storage device which stores a dither matrix for a halftoning process; and
    a comparator responsive to the computer readable storage device, the dither matrix comprising a thresholdable multibit array, the multibit array, when threshold at a number of levels, producing a plurality of substantially green noise dot profiles, each dot profile appropriate for the respective level.

16. The machine of claim 15, wherein the multibit array comprises a two-dimensional array.

17. The machine of claim 15, wherein the computer readable storage device is incorporated into a digital computer.

18. The machine of claim 15, wherein the computer readable storage device comprises a read only memory.

19. The machine of claim 15, wherein the computer readable storage device is incorporated into a digital computer.

20. The machine of claim 15, herein a significant number of the dot profiles are matched to respective green noise power spectra.

21. The machine of claim 15, wherein a significant number of the dot profiles are matched to respective green noise pair correlations.

22. The machine of claim 15, wherein the multibit array, when thresholded at a number of levels, produces a majority of substantially green noise dot profiles.

23. An apparatus for use in halftoning an image, the apparatus comprising:
    a dither matrix stored in a computer readable storage device; and
    a comparator responsive to the computer readable storage device, the dither matrix comprising a multibit array that can be thresholded, the multibit array, when thresholded at a plurality of respective levels, producing a plurality of substantially green noise dot profiles, each dot profile appropriate for the respective level.

24. The apparatus of claim 23, further comprising a display device responsive to the computer readable storage device, the display device receiving a halftoned array output from the comparator and producing a halftoned output image.

25. The apparatus of claim 23, Wherein the computer readable storage device comprises a computer memory.

26. The apparatus of claim 23, wherein the dot profiles are matched to respective power spectra.

27. The apparatus of claim 23, wherein the dot profiles are matched to respective pair correlations.

28. A computer readable memory device comprising a thresholdable halftoning mask, the halftoning mask producing a plurality of dot profiles when thresholded at respective levels, and at least a plurality of the dot profiles having substantially green noise power spectrum appropriate for the respective level and a comparator responsive to the computer readable memory device.

29. The computer readable memory device of claim 28, wherein the mask is stored as an array.

30. The computer readable memory device of claim 29, wherein the array comprises a plurality of storage elements, each storage element containing a respective multibit data value.

31. A combination comprising:
   a printing device; and
   a computer readable memory device having a thresholdable halftoning mask, the halftoning mask producing a plurality of dot profiles when thresholded at respective levels, and at least a plurality of the dot profiles having substantially green noise power spectrum appropriate for the respective level and a comparator responsive to the computer readable memory device, wherein the mask is stored as an array and the array comprises a plurality of storage elements, each storage element containing a respective multibit data value.

32. The combination of claim 31, wherein the printing device comprises at least one of a laser printer, an ink jet printer, a thermal printer, a thermal wax printer, a dye-sublimation printer and a bubble jet printer.

33. A combination comprising:
   a computer readable memory device having a thresholdable halftoning mask, the halftoning mask producing a plurality of dot profiles when thresholded at respective levels, and at least a plurality of the dot profiles having substantially green noise power spectrum appropriate for the respective level and a comparator responsive to the computer readable memory device, wherein the mask is stored as an array and the array comprises a plurality of storage elements, each storage element containing a respective multibit data value; and
   a comparator having a first input, a second input, and an output, the first input responsive to the computer readable memory device.

34. The combination of claim 33, further comprising a scanner for digitizing an input image and generating an image array, the image array comprising a plurality of values, and wherein the second input is responsive to the scanner.

35. The combination of claim 34, wherein the comparator performs a comparison between signals appearing on the first and second inputs.

36. The combination of claim 35, further comprising a display responsive to the comparator.

37. The combination of 36, wherein the display comprises a binary display.

38. A combination comprising:
   a recording device; and
   a computer readable memory device having a thresholdable halftoning mask, the halftoning mask producing a plurality of dot profiles when thresholded at respective levels, and at least a plurality of the dot profiles having substantially green noise power spectrum appropriate for the respective level and a comparator responsive to the computer readable memory device, wherein the mask is stored as an array and the array comprises a plurality of storage elements, each storage element containing a respective multibit data value.

39. A combination comprising:
   a facsimile machine; and
   a computer readable memory device having a thresholdable halftoning mask, the halftoning mask producing a plurality of dot profiles when thresholded at respective levels, and at least a plurality of the dot profiles having substantially green noise power spectrum appropriate for the respective level and a comparator responsive to the computer readable memory device.

40. A computer readable memory device comprising a thresholdable halftoning mask, the halftoning mask producing a plurality of dot profiles when thresholded at respective levels, and at least a plurality of the dot profiles having a substantially green noise pair correlations appropriate for the respective level and a comparator responsive to the computer readable memory device.

41. The computer readable memory device of claim 40, wherein the mask is stored as an array.

42. The computer readable memory device of claim 41, wherein the array comprises a plurality of storage elements, each storage element containing a respective multibit data value.

43. A combination comprising:
   a printing device; and
   a computer readable memory device having a thresholdable halftoning mask, the halftoning mask producing a plurality of dot profiles when thresholded at respective levels, and at least a plurality of the dot profiles having a substantially green noise pair correlations appropriate for the respective level and a comparator responsive to the computer readable memory device, wherein the mask is stored as an array and the array comprises a plurality of storage elements, each storage element containing a respective multibit data value.

44. The combination of claim 43, wherein the printing device comprises at least one of a laser printer, an ink jet printer, a thermal printer, and thermal wax paper, a dye-sublimation printer and a bubble jet printer.

45. A combination comprising:
   a computer readable memory device having a thresholdable halftoning mask, the halftoning mask producing a plurality of dot profiles when thresholded at respective levels, and at least a plurality of the dot profiles having a substantially green noise pair correlations appropriate for the respective level and a comparator responsive to the computer readable memory device, wherein the mask is stored as an array and the array comprises a plurality of storage elements, each storage element containing a respective multibit data value; and
   a comparator having a first input, a second input, and an output, the first input responsive to the computer readable memory device.

46. The combination of claim 45, her comprising a scanner for digitizing an input image and generating an image array, the image array comprising a plurality of values, and wherein the second input is responsive to the scanner.

47. The combination of claim 46, wherein the comparator performs a comparison between signals appearing on the first and second inputs.

48. The combination of claim 47, further comprising a display responsive to the comparator.

49. The combination of claim 48, wherein the display comprises a binary display.

50. A combination comprising:
   a recording device; and
   a computer readable memory device having a thresholdable halftoning mask, the halftoning mask producing a plurality of dot profiles when thresholded at respective levels, and at least a plurality of the dot profiles having a substantially green noise pair correlations appropriate for the respective level and a comparator responsive to the computer readable memory device, wherein the mask is stored as an array and the array comprises a plurality of storage elements, each storage element containing a respective multibit data value.

51. A combination comprising:

a facsimile machine; and a computer readable memory device having a thresholdable halftoning mask, the halftoning mask producing a plurality of dot profiles when thresholded at respective levels, and at least a plurality of the dot profiles having a substantially green noise p air correlations appropriate for the respective level and a comparator responsive to the computer readable memory device.

52. A machine comprising:

a computer readable storage device which stores a dither matrix for use in halftoning image information; and a comparator responsive to the computer readable storage device, the dither matrix comprising at least one thresholdable array designed to produce a plurality of local aperiodic, non-white noise and non-blue noise dot profiles when thresholded at respective levels.

53. The machine of claim 52, wherein a significant number of the dot profiles are substantially green noise dot profiles.

54. The machine of claim 52, wherein each of a significant number of the dot profiles has a respective power spectrum substantially characteristic of a green noise pair correlation.

55. The machine of claim 52, wherein each of the dot profiles has a respective pair correlations substantially characteristic of a green noise pair correlation.

56. The machine of claim 52, wherein a significant number of the dot profiles have small low-frequency components.

57. The machine of claim 52, wherein a significant number of the dot profiles have small low-frequency components.

58. The machine of claim 52, wherein a significant number of the dot profiles have small low-frequency components.

59. The machine of claim 52, wherein a significant number of the dot profiles have smaller high-frequency components than mid-range.

60. A machine comprising:

a computer readable storage device which stores an array for use in halftoning image information, the array comprising a non-white noise and non-blue noise, locally aperiodic, thresholdable dither matrix; and a comparator responsive to the dither matrix.

61. The machine of claim 60, wherein the array comprises a green-noise, locally aperiodic thresholdable matrix.

62. The machine of claim 60, wherein the array comprises a multibit array.

63. The machine of claim 60, wherein the array produces a plurality of locally aperiodic dot profiles with wraparound properties, each of the dot profiles being associated with a respective threshold level.

64. The machine of claim 60, wherein the array comprises a cumulative array.

65. The machine of claim 60, wherein the dither matrix is designed to produce a plurality of locally aperiodic dot profiles, and wherein each of the dot profiles is visually pleasing.

66. The machine of claim 60, wherein the comparator is further responsive to information derived from an image.

67. The machine of claim 60, wherein the image comprises a color image.

68. The machine of claim 60, wherein the computer readable storage device comprises a computer memory.

69. A machine comprising:

a computer readable storage device which stores an array for use in halftoning image information, the array comprising a non-white and non-blue noise, non-ordered thresholdable dither matrix; and a comparator responsive to the dither matrix.

70. The machine of claim 69, wherein the array comprises a green noise, non-ordered thresholdable dither matrix.

71. Apparatus for generating a green noise mask array in which the green noise mask array may be used to generate a more pleasing halftoned image than a blue noise mask array, the apparatus comprising:

a reading device for reading each of the values of the green noise mask array;

a receiving device for receiving maximum and minimum predetermined values input by a user;

a first comparing device for comparing each of the values of the green noise mask array to the maximum predetermined value and replacing the value if it exceeds the maximum predetermined value; and a second comparing device for comparing each of the values of the green noise mask array to the minimum predetermined value and replacing the value if it is less than the minimum predetermined value, wherein the maximum and minimum predetermined values input by the direct value mapping function are selected to compensate for characteristics of at least one of printer and display devices used by the user so as to form a more pleasing halftoned image.

72. The apparatus of claim 71, further including a memory for storing the green noise mask array.

\* \* \* \* \*

UNITED STATES PATENT AND TRADEMARK OFFICE
CERTIFICATE OF CORRECTION

PATENT NO.    : 6,493,112 B1
DATED         : December 10, 2002
INVENTOR(S)   : Gonzalo R. Arce et al.

It is certified that error appears in the above-identified patent and that said Letters Patent is hereby corrected as shown below:

Column 28,
Line 25, "heirin" should be deleted and replaced with -- wherein --.
Line 49, "Wherein" should be deleted and replaced with -- wherein --.

Column 30,
Line 43, "her" should be deleted and replaced with -- further --.

Column 31,
Line 7, "p air" should be deleted and replaced with -- pair --.

Signed and Sealed this

Eighteenth Day of March, 2003

JAMES E. ROGAN
*Director of the United States Patent and Trademark Office*